US009772414B2

(12) United States Patent
Diller

(10) Patent No.: US 9,772,414 B2
(45) Date of Patent: Sep. 26, 2017

(54) SYSTEM AND METHOD FOR MICROSEISMIC DATA ACQUISITION USING SENSOR PATCHES

(71) Applicant: David E. Diller, Greenwood Village, CO (US)

(72) Inventor: David E. Diller, Greenwood Village, CO (US)

(73) Assignee: NANOSEIS LLC, Greenwood Village, CO (US)

( * ) Notice: Subject to any disclaimer, the term of this patent is extended or adjusted under 35 U.S.C. 154(b) by 0 days.

(21) Appl. No.: 15/069,909

(22) Filed: Mar. 14, 2016

(65) Prior Publication Data

US 2016/0202373 A1   Jul. 14, 2016

Related U.S. Application Data

(62) Division of application No. 13/696,029, filed as application No. PCT/US2012/045765 on Jul. 6, 2012, now Pat. No. 9,395,456.

(60) Provisional application No. 61/505,228, filed on Jul. 7, 2011.

(51) Int. Cl.
*G01V 1/28* (2006.01)

(52) U.S. Cl.
CPC ........ *G01V 1/288* (2013.01); *G01V 2210/123* (2013.01); *G01V 2210/65* (2013.01)

(58) Field of Classification Search
None
See application file for complete search history.

(56) References Cited

U.S. PATENT DOCUMENTS 3,739,871 A   6/1973   Bailey
6,389,361 B1  5/2002   Geiser
6,868,037 B2  3/2005   Dasgupta
(Continued)

FOREIGN PATENT DOCUMENTS

WO   WO 2013/006794 A1   1/2013

OTHER PUBLICATIONS

M. Bohnhoff, Seismic detection of CO2 leakage along monitoring wellbores, Jul. 20, 2009, pp. 687-697.*
(Continued)

*Primary Examiner* — Tung Lau
(74) *Attorney, Agent, or Firm* — Michael Reilly LLC

(57) ABSTRACT

Disclosed herein are various embodiments of methods and systems for optimizing the analysis of the source locations of microseismic sources, comprising recording microseismic data using patches of sensors. Each patch contains multiple sensors, arranged as a grid or a line segment. This approach uses fewer sensors and can cover a larger area than previous techniques for acquiring microseismic data. The data recorded in this way can be filtered using directional filters, such that each patch may be targeted at a specific point in the subsurface. The microseismic source-scanning algorithm benefits from having data filtered to include directional signals only from pairs of patch locations and subsurface locations. This produces an improved estimate of the locations of microseismic events. The patches may be disposed about a horizontal well bore, and aligned such that directional filtering enhances data from hydraulic fracturing operations in the wellbore.

20 Claims, 14 Drawing Sheets

(56) References Cited

U.S. PATENT DOCUMENTS

| | | | |
|---|---|---|---|
| 7,127,353 B2 | 10/2006 | Geiser | |
| 7,391,675 B2 | 6/2008 | Drew | |
| 9,395,456 B2 * | 7/2016 | Diller | G01V 1/288 |
| 2004/0006430 A1 * | 1/2004 | Harmon | G01V 11/002 |
| | | | 702/14 |
| 2009/0238040 A1 * | 9/2009 | Duncan | G01V 1/366 |
| | | | 367/38 |
| 2013/0054147 A1 | 2/2013 | Diller | |

OTHER PUBLICATIONS

Honn Kao and Shao-Ju Shan, "The Source-Scanning Algorithm: mapping the distribution of seismic sources in time and space" Geophys. J. Int. (2004) 157, 589-594.

Realtime Earthquake Location Using Kirchhoff Reconstruction, Teresa Baker, Robert Granat and Robert W. Clayton, Bulletin of the Seismological Society of America, vol. 95, No. 2, pp. 699-707, Apr. 2005.

David E. Diller and Stephen P. Gardner, "Comparison of simultaneous downhole and surface microseismic monitoring in the Williston Basin", 2011 Annual International Meeting, SEG, Expanded Abstracts.

Eisner et al., "Comparison of surface and borehole locations of induced seismicity", Geophysical Prospecting, vol. 58, Issue 5, pp. 809-820, Sep. 2010.

\* cited by examiner

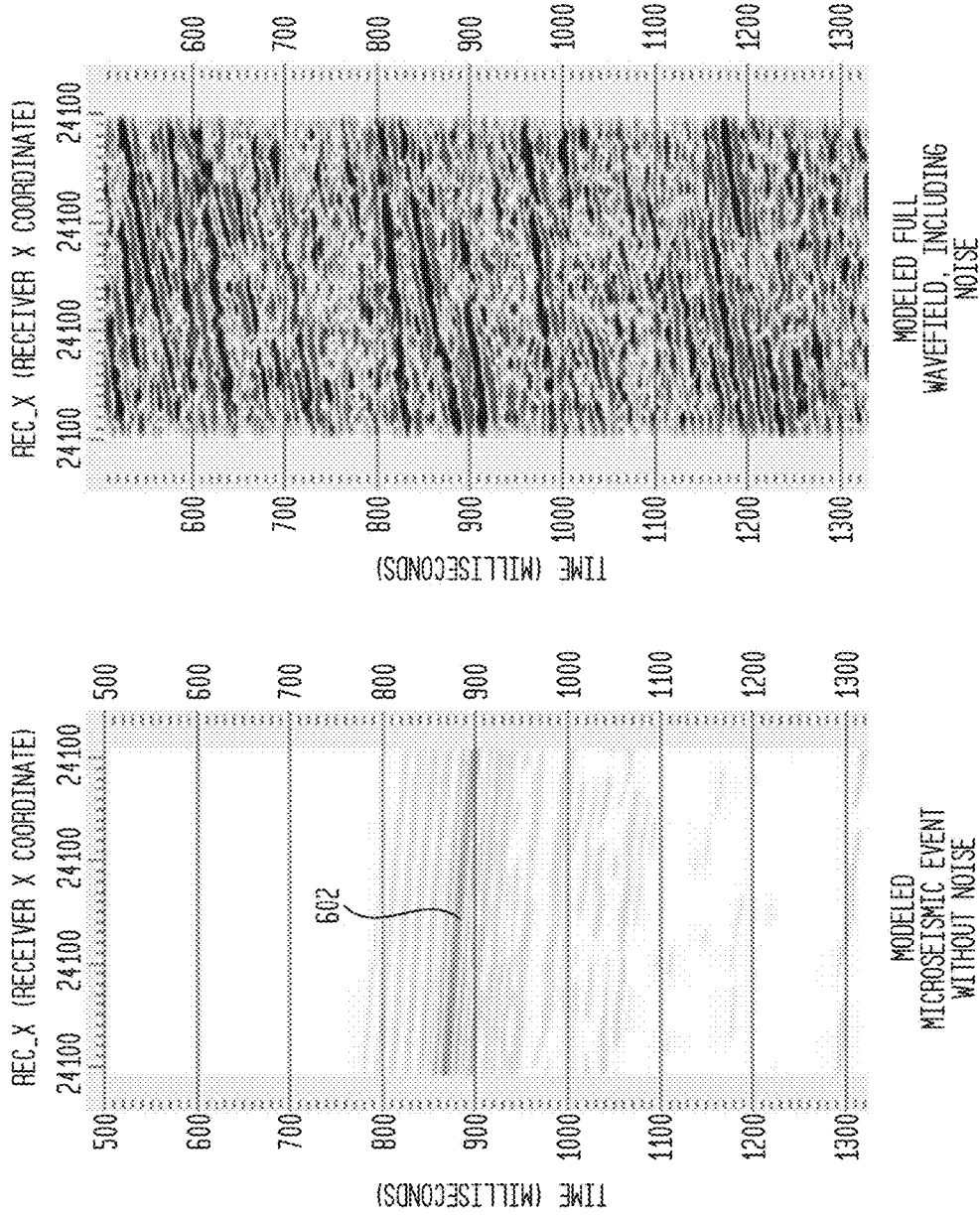

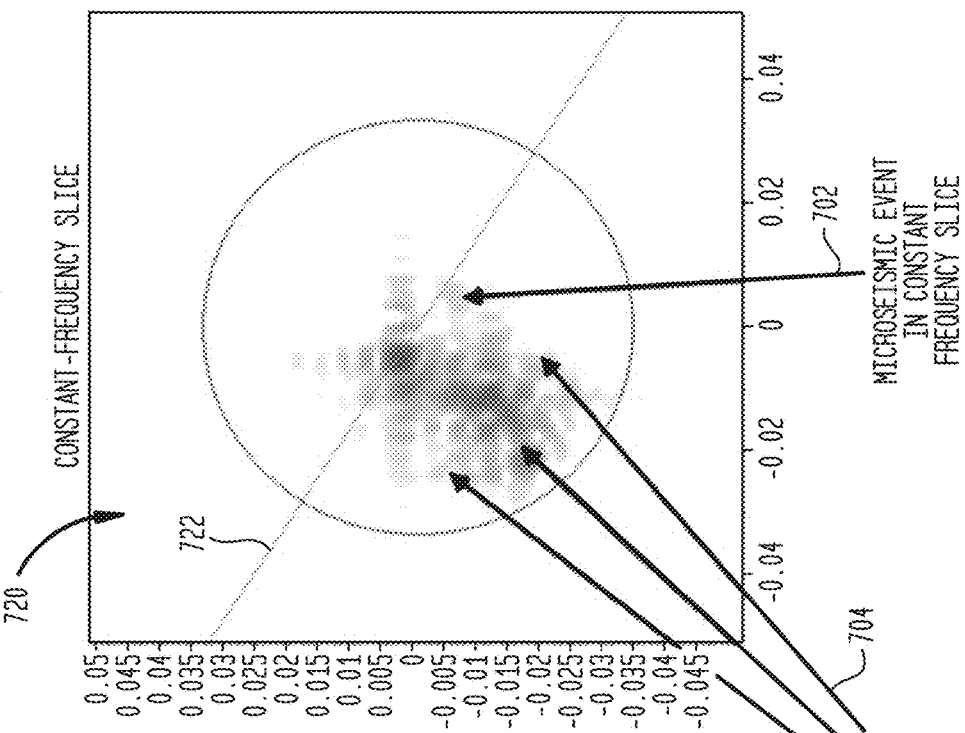
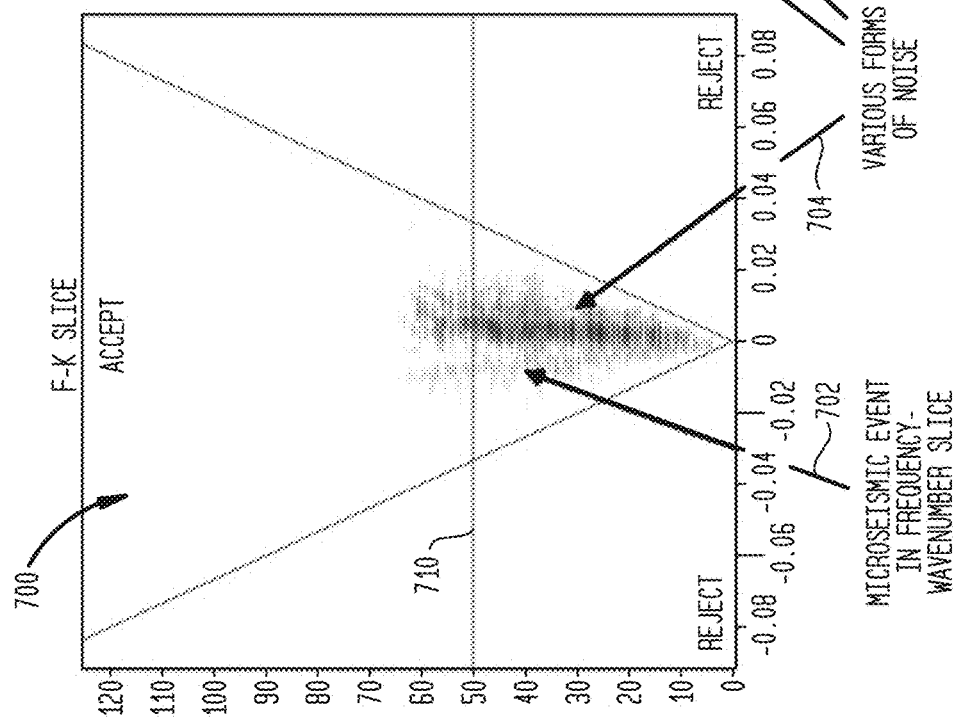

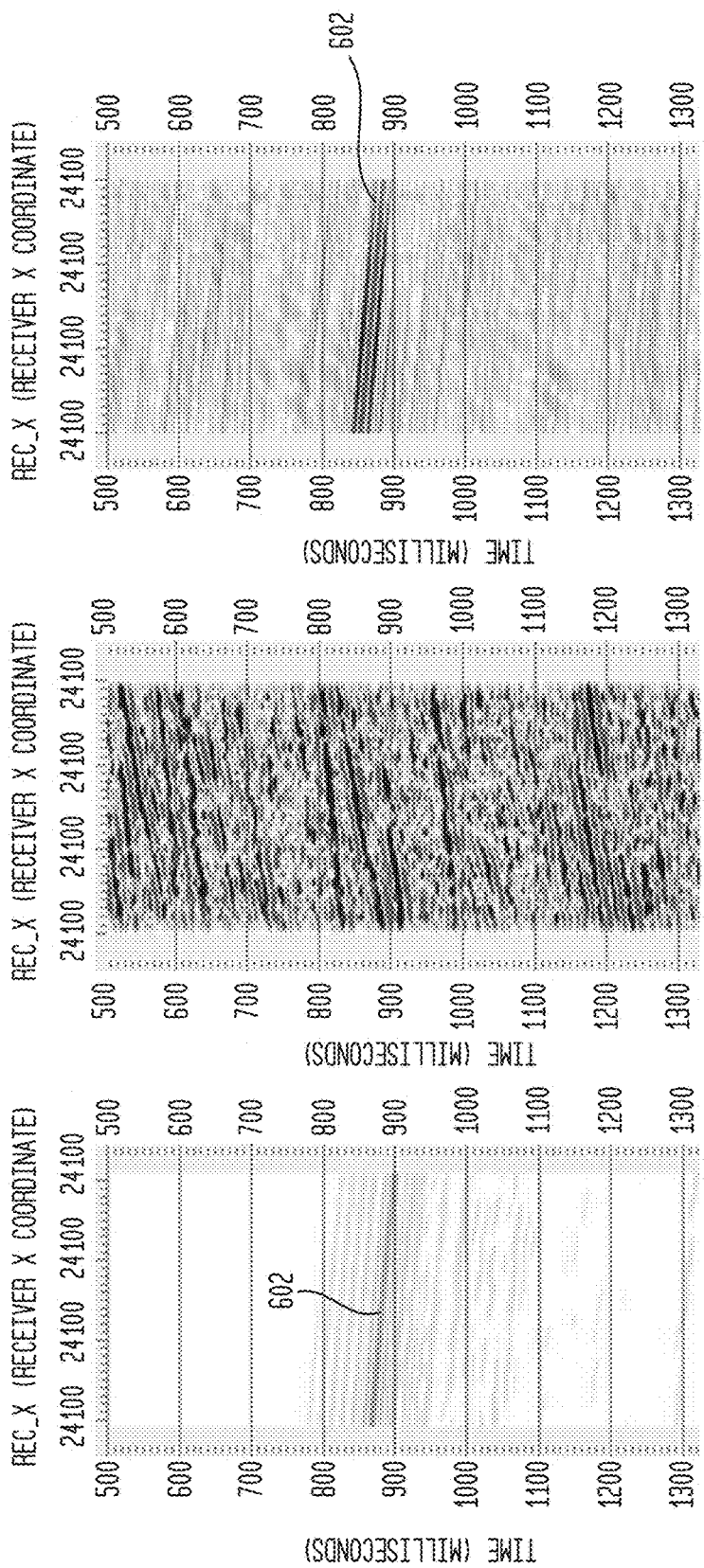

SYSTEM AND METHOD FOR MICROSEISMIC DATA ACQUISITION USING SENSOR PATCHES

DIVISIONAL APPLICATION

The present application is divisional application based on U.S. patent application Ser. No. 13/696,029, the disclosure of which is incorporated herein by reference, which was the subject of a Requirement for Election/Restriction issued on May 27, 2015.

CROSS REFERENCE TO RELATED APPLICATIONS

This Divisional Application claims the benefit under U.S.C. §121 of U.S. patent application Ser. No. 13/696,029, filed on Nov. 2, 2012, the disclosure of which is incorporated herein by reference.

U.S. patent application Ser. No. 13/696,029 was published on Feb. 28, 2013 as US Patent Application Publication No. 2013/0054147, the disclosure of which is incorporated herein by reference.

U.S. patent application Ser. No. 13/696,029 claims the benefit under 35 USC §119(b) as the National Stage entry under 35 USC §371 of PCT application number PCT/US2012/045765, filed on Jul. 6, 2012, the disclosure of which is incorporated herein by reference.

PCT Patent Application No. PCT/US2012/045765 was published on Jan. 10, 2013 as WO 2013/006794, the disclosure of which is incorporated herein by reference.

PCT application number PCT/US2012/045765, filed on Jul. 6, 2012, claims the benefit under 35 USC §119 (e) of U.S. Provisional Patent Application No. 61/505,228 filed on Jul. 7, 2011, the disclosure of which is incorporated herein by reference.

PERTINENT SECTIONS OF THE SPECIFICATION

This Divisional Application is based on claims 1-6 of U.S. patent application Ser. No. 13/696,029, which were withdrawn from the ongoing examination of that application as the result of a Requirement for Election/Restriction issued on May 27, 2015.

The specification is unchanged from U.S. patent application Ser. No. 13/696,029 other than the Summary, which is a reformatted version of the independent claims. The Summary provided herein is a reformatted version of the independent claims in this Divisional Application. No other changes have been made to the specification and no new matter has been introduced.

This Divisional Application describes a system and method for acquiring microseismic data using sensors grouped in patches on the surface of the earth. It should be understood that the present application refers to recording data using patches of sensors. As with all seismic data, how the recorded data are processed is dependent on the way in which the data were recorded. Knowing how the microseismic data are to be processed to identify microseismic events is relevant in assisting one of skill in the art when acquiring the microseismic data in the field using the systems and methods described herein.

FIELD

Various embodiments described herein relate to the field of seismic data acquisition and processing, and devices, systems and methods associated therewith.

BACKGROUND

Microseismic monitoring, that is, acquisition and processing of data connected with microseismic events, has been used for some time to infer the locations of faults and joints in the subsurface of the earth. Earthquake monitoring is typically performed by placing arrays of instruments at or near the surface of the earth. These instruments sense the motion of the earth caused by the propagation of seismic energy from the microseismic events, and convert this motion into corresponding data related to the events. These data may then be used to locate the origin of the seismic energy, that is, the microseismic event, in the subsurface of the earth.

More recently, microseismic techniques have been used to monitor fractures occurring in the subsurface of the earth as a result of hydraulic fracturing. Hydraulic fracturing is the process of creating or enhancing fractures in rock formations by pumping fluid at high pressure into a well bore, causing the surrounding geologic layers to fracture. Fracturing causes seismic events that emit energy in the form of seismic waves. The magnitude of these events is typically less than zero on the Richter scale. This seismic energy can be detected and mapped to show the location and the extent of the fractures created or enhanced by the hydraulic fracturing operation. Microseismic monitoring is typically performed by placing arrays of instruments in wells or boreholes, or near or at the surface of the earth, in the vicinity of the hydraulic fracturing operation.

The purpose of this microseismic monitoring is to determine if the hydraulic fracturing has had the intended effects within the hydrocarbon-bearing rock formation, and whether there are any unintended effects, such as opening fractures into shallower layers or groundwater aquifers. Microseismic monitoring is often performed in real time during the hydraulic fracturing operation, in which case the fracturing operation can be modified or stopped if unintended fracturing events are evident.

In microseismic surveys, the source of the energy is a fracture in the subsurface of the earth, which produces a very low level of seismic energy, hence the amount of energy that reaches the surface and is detected by the geophones is extremely small. Therefore microseismic monitoring is limited by noise contamination. Noise contamination may include surface waves, refracted waves, and reflected waves, that is, seismic energy from surface noise sources that is transmitted into the earth and reflected back from within the subsurface. Reflected noise waves are particularly problematic because the angle of incidence of their arrival at the surface is very close to the angle of incidence of energy from microseismic events, making reflected noise essentially impossible to separate and remove by conventional methods. Noise contamination masks microseismic signals and can lead to the false identification of noise as microseismic events.

What is desired are improved techniques wherein surface microseismic data are acquired and processed in such a manner that most of the noise is eliminated, thereby allowing detection and location of more and smaller microseismic events. The resulting improvement in the signal to noise ratio of the microseismic data allows for better event locations that in turn may more accurately represent the effects of hydraulic fracturing, and avoid false events that may misrepresent the effects of hydraulic fracturing.

SUMMARY

In one embodiment, there is provided a system for a system for acquiring microseismic data using sensor patches comprising: a microseismic event generator disposed in the subsurface of the earth along a first axis; a plurality of sensors capable of sensing microseismic data; a plurality of distinct patches of sensors disposed upon the surface, each distinct patch of sensors comprising multiple sensors, the patches of sensors being configured to sample data and noise and an analyzer having at least one processor, the analyzer being capable of recording microseismic data from the plurality of sensors at a sampling interval of between 0.25 and 16 milliseconds over a predetermined time window in the range of one minute to several days.

In another embodiment, there is provided a method for acquiring microseismic data using sensor patches comprising: deploying a plurality of sensors on or proximate the surface of the earth, the sensors being disposed in a plurality of distinct patches of sensors above a selected subsurface volume, each distinct patch of sensors comprising multiple sensors, the patches of sensors being configured to sample data and noise; recording microseismic data from the plurality of distinct patches of sensors, at a sampling interval of between 0.1 and 16 milliseconds, over a predetermined time window in the range of one minute to several days.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIG. 6A shows modeled microseismic data such as would be recorded at a patch from a microseismic event occurring at a microseismic event generator, without noise;

FIG. 6B shows modeled microseismic data such as would be recorded at a patch from a microseismic event occurring at a microseismic event generator, including the full wavefield, with noise;

FIG. 7A shows a frequency-wavenumber slice of mathematically modeled seismic data containing a microseismic event and various forms of noise after an FKK transform;

FIG. 7B shows a constant frequency slice of mathematically modeled seismic data containing a microseismic event and various forms of noise after an FKK transform;

FIG. 9A shows a mathematically modeled seismic event without noise;

FIG. 9B shows the mathematically modeled seismic event including the full wavefield with noise;

FIG. 9C shows the mathematically modeled seismic event data after narrow beam FKK filtering;

The drawings are not necessarily to scale. Like numbers refer to like parts or steps throughout the drawings.

DETAILED DESCRIPTION OF SOME EMBODIMENTS

Figure 1:
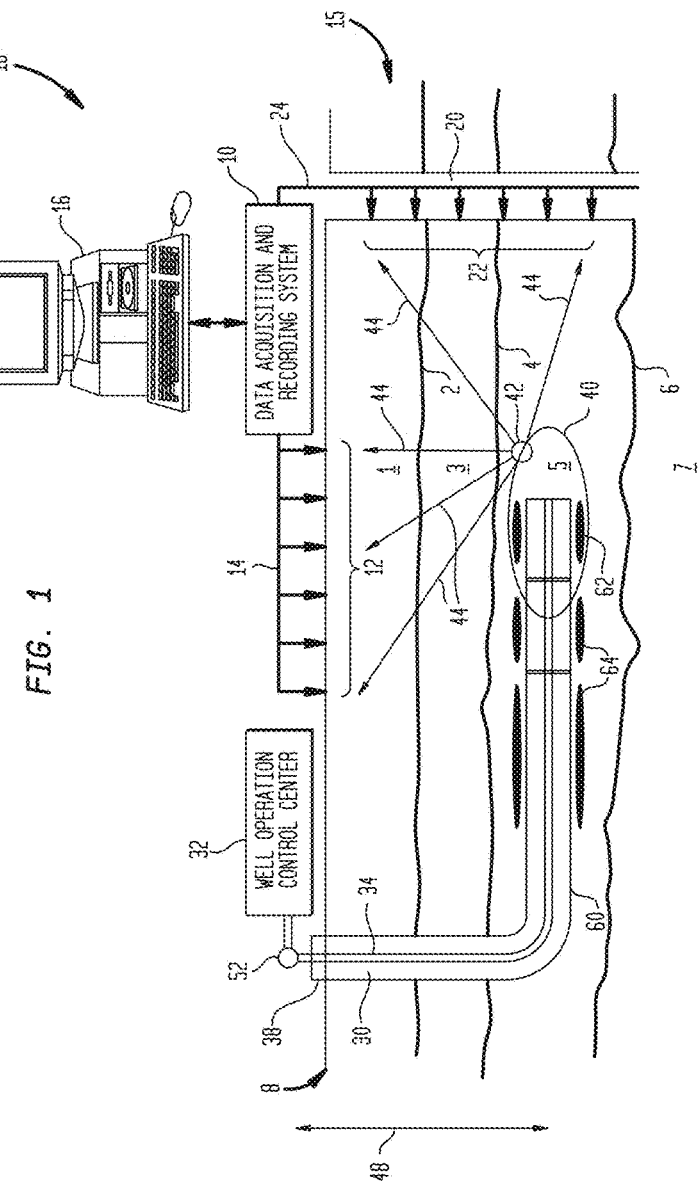
FIG. 1 shows one embodiment of a cross-sectional view of the earth and a microseismic data acquisition, recording and analysis system.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes and devices and systems finding application in the various embodiments described herein are not disclosed in detail.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth. In the drawings, some, but not all, possible embodiments are illustrated, and further may not be shown to scale.

For the first 100 years and more of oil exploration and production, wells were drilled almost exclusively in geologic formations that permitted production of oil and gas flowing under the natural pressures associated with the formations. Such production required that two physical properties of the geologic formation fall within certain boundaries. The porosity of the formation had to be sufficient to allow a substantial reserve of hydrocarbons to occupy the interstices of the formation, and the permeability of the formation had to be sufficiently high that the hydrocarbons could move from a region of high pressure to a region of lower pressure, such as when hydrocarbons are extracted from a formation. Typical geologic formations having such properties include sandstones.

In recent years, it has become apparent that large reserves of hydrocarbons are to be found in shale formations. Shale formations are typically not highly permeable, and therefore present formidable obstacles to production. The most common technique in use today that permits commercial production of hydrocarbons, and especially natural gas, from shale formations, is hydraulic fracturing. This technique can be also be applied to older wells drilled through non-shale formations to increase the proportion of hydrocarbons that can be extracted from them, thus prolonging the productive life of the well.

Hydraulic fracturing involves pumping fluid under very high pressure into hydrocarbon-bearing rock formations to force open cracks and fissures and allow the hydrocarbons residing therein to flow more freely. The fluid is primarily water, and may contain chemicals to improve flow, and also "proppants" (an industry term for substances such as sand). When the fracturing fluid is removed, and the hydrocarbons are allowed to flow, the sand grains prop open the fractures and prevent their collapse, which might otherwise quickly stop or reduce the flow of hydrocarbons.

Drilling technology has evolved to allow wells to be drilled along virtually any direction, and is no longer constrained to the drilling of vertical wells only. Deviated wells are thus often drilled horizontally along specific geologic formations to increase production potential. The extent of a hydrocarbon-producing formation in a vertical well may be measured in feet, or perhaps tens or hundreds of feet in highly productive areas. The maximum area of the formation in contact with the vertical well bore is quickly computed as the circumference of the well multiplied by the height of the producing formation. In practice, the producing area is much less than this figure. By drilling horizontally or non-vertically through a formation, the extent of the formation in contact with the wellbore can be much greater than is possible with vertically-drilled wells. Injecting such deviated wells with hydraulic fracturing fluid under high pressure can result in the propagation of fractures outwardly from the wellbore, and thereby increase significantly the total volume of the subsurface from which the hydrocarbons can be extracted.

The progress of a fracturing operation must be monitored carefully. Well fracturing is expensive, and the fracturing process is frequently halted once its benefits become marginal. The high pressures associated with fracturing result in fractures that tend to follow existing faults and fractures, and can result in an uneven or unpredictable fracture zone. Fracturing fluid may also begin following an existing fault or fracture zone and then propagate beyond the intended fracture zone. Care must be taken not to interfere with existing production wells in the area. For these and other reasons, it is important that the fracturing operator be able to follow accurately the progress of the fluid front in the subsurface while the fluid is being injected into the well. Monitoring the fracturing process allows the operator to optimize the process and potentially to recover more gas or oil from the formation than would otherwise be possible.

Conventional surface seismic reflection surveys generally do not work well for monitoring the movement or positions of fluid fronts in the subsurface. The physical dimensions of fractures are often shorter than can be detected using conventional surface seismic reflection techniques. In addition, within a given geologic formation there may be no or low contrasts in seismic velocity, and as a result surface seismic reflection techniques cannot be used effectively to image fractures within the formation. Fractures also tend to scatter seismic energy, further reducing their detectability by conventional surface seismic reflection means.

An alternative approach to the problem of imaging fractures or fluid fronts within formations known as "microseismicity" has its origins in earthquake seismology. Instead of using "active" surface seismic energy sources, "passive seismic" techniques are used to detect the times and locations of the origins of seismic energy generated in the subsurface of the earth by events such as earthquakes and slippage on faults. In earthquake seismology, neither the time nor the exact location of the earthquake are known in advance, and therefore monitoring must be continuous and must be performed over a wide area. Methods have evolved that require listening for extended periods of time, that is, hours, days or weeks, and using various algorithms to extract the very low level signals from the background noise.

In contrast to conventional seismic exploration surveys that use closely spaced sensors in regular patterns, earthquake microseismic methods use sparse arrangements of sensors, often placed where convenient and not in a regular pattern. Therefore new techniques had to be developed to record and process the data recorded from these sensors. Data are recorded over an extended time period, with the duration of recording and the sampling interval being controlled by the objectives of the seismic data acquisition process, the characteristics of the events that generate the detected or sensed seismic energy, the distances involved, the characteristics of the subsurface, and other factors. The data recorded at each sensor location are then filtered and processed using various processing techniques and software, which convert the data into a series of values within gridded subsurface volumes corresponding to multiple time samples. The values of the points in the grid represent attributes of the data, which values vary over time as the energy emitted at each point in the subsurface varies.

A similar approach is used to monitor the subsurface during a hydraulic fracturing procedure. Seismic energy emitted by fracturing of a geologic formation, caused by the injection of high pressure fracturing fluid into the formation, is sensed and recorded. The objective then becomes determining the point of origin of the emitted seismic energy, which defines the location of the fracture. Hydraulic fracturing was developed in the late 1940s, and has recently become much more widely used in the development of shale gas and oil. Techniques to monitor the hydraulic fracturing were introduced in the 1970s. See U.S. Pat. No. 3,739,871 "Mapping of Earth Fractures Induced by Hydrafracturing" to Bailey.

FIG. 1 shows one example of how microseismic data are acquired during a hydraulic fracturing operation. FIG. 1 shows a cross-sectional view of the earth with geologic layers 1, 3, 5 and 7. The interfaces between these layers are 2, 4 and 6, and the surface of the earth is shown at 8. It will be understood by those of ordinary skill in the art that this is a very simplified model of the geology in the subsurface of the earth. Vertical well bore 30 has been drilled and deviated to a horizontal well bore 60. Horizontal well bore 60 is at a depth 48 below Kelly bushing 52. Depth 48 is typically several thousands of feet, often 10,000-14,000 feet. One or more additional boreholes 20 may have been drilled for previous wells, or may have been drilled specifically for the purpose of placing downhole sensors 22. Such purpose-drilled boreholes 20 are typically not drilled to the same depths as production well bores 30.

A hydraulic fracturing operation is shown in progress in horizontal wellbore 60. Under the control and direction of well operation control center 32, hydraulic fracturing fluid is pumped at high pressure through pipe 34 into vertical wellbore 30 and hence into horizontal wellbore 60. The high pressure forces fracturing fluid out through perforations in wellbore 60 into zones 62 in hydrocarbon producing geologic formation 5 around wellbore 60. The high pressure of the fluid creates fractures or enhances existing fractures in surrounding subsurface volume 40 within formation 5, causing one or more releases of seismic energy at point of fracture 42. The fracturing process can be repeated multiple times at different locations within wellbore 60 to fracture additional zones 64.

This seismic energy propagates from point of fracture 42 through subsurface 15 of the earth as a series of acoustic wavefronts or seismic waves 44, which are then sensed by surface sensors 12 disposed along surface 8 and/or downhole sensors 22 disposed in borehole 20, converted into electrical, optical and/or magnetic analog or digital signals, and recorded by data acquisition and recording system 10 using techniques and equipment well known in the art. The electrical, magnetic, or optical analog or digital signals generated by sensors 12 and 22 are proportional to the displacement, velocity or acceleration of the earth at locations corresponding to sensors 12 and 22, where such displacement, velocity or acceleration is caused by seismic wavefront 44 arriving at the locations of sensors 12 and/or 22, and are recorded as data by recording system 10. As further shown in FIG. 1, data acquisition, processing and interpretation/analysis system 18 comprises surface sensors 12 and downhole sensors 22 operably connected to data acquisition and recording system 10, and data processing computer 16 operably connected to data acquisition and recording system 10.

According to one embodiment, data may be recorded, processed and analyzed or interpreted while fracturing is occurring, thereby enabling near-real-time monitoring of the fracturing process.

Note that FIG. 1 shows only one of many possible embodiments of system 18 for acquiring, processing and interpreting/analyzing microseismic data in a well setting. Data acquisition and processing configurations other than that shown in FIG. 1 may be employed. For example, only surface sensors 12 may be employed or only downhole sensors 22 may be employed, and downhole sensors may be employed in well bore 30 in addition to or instead of in borehole 20. Seismic sensors 12 and 22 may be deployed both along surface 8 and in borehole 20 and/or vertical well bore 30. Any suitable combination of surface sensors 12 and/or downhole sensors 22 may be employed. By way of example, sensors 12 and 22 may be geophones, accelerometers, piezoelectric sensors, hydrophones, or any other suitable acoustic sensor. One-, two- or three-axis geophones may also be used in sensors 12 on surface 8 or in sensors 22 in boreholes 20 and/or vertical well bore 30. Sensors 22 may be cemented in place permanently in borehole 20 or vertical well bore 30, and thereafter used to acquire data for multiple projects. Sensors 22 may also be lowered into borehole 20 on wireline or cable 24. The electrical, magnetic or optical signals from sensors 22 are then transmitted to the data acquisition and recording system 10 along wireline or cable 24. Note further that data acquisition, processing and interpretation system 18 may be employed in land, marine, off-shore rig, and transition zone settings. In addition, multiple data processing computers 16 may be employed, and/or multiple data acquisition and recording systems 10 may be employed.

In other embodiments, signals generated by sensors 12 and/or 22 are transmitted by wireless transmitters to a receiver operably connected to data acquisition and recording system 10. In still other embodiments, the electrical, magnetic and/or optical signals generated by sensors 12 and/or 22 are stored as data in solid state or other memory or recording devices associated with one or more sensors 12 and/or 22. The memories or recording media associated with the recording devices may be periodically collected or polled, and the data stored therein uploaded to data acquisition and recording system 10.

Other embodiments include, but are not limited to, the recording of the seismic waves created by the energy released by explosive charges during the perforation of vertical wellbore 30 or horizontal wellbore 60. When vertical wellbore 30 and horizontal wellbore 60 are cased with a metal pipe or casing, the casing must be perforated so that oil or gas may flow into pipe 34 and thence to surface of the earth 8 at wellhead 38. Small explosive charges are used to perforate the casing and create perforations through which oil or gas may then flow. Perforation is also required before a hydraulic fracturing operation can take place, to allow the hydraulic fracturing fluids to flow into the surrounding formations.

Still other configurations and embodiments may be employed to locate, measure and analyze faults in the subsurface of the earth by microseismic detection and processing means, such as, for example, sensing, recording and analyzing seismic energy originating from naturally occurring events, such as slippage along faults, settling or tilting of the subsurface, earthquakes, and other naturally-occurring events.

Data recorded by data acquisition and recording system 10 are typically, although not necessarily, in the form of digitally sampled time series commonly referred to as seismic traces, with one time series or seismic trace corresponding to each sensor 12 or 22. Each value in the time series is recorded at a known time and represents the value of the seismic energy sensed by sensors 12 and 22 at that time. The data are recorded over a period of time referred to as the data acquisition time period. The data acquisition time period varies depending on the objective of the seismic survey. When the objective of the survey is to monitor a fracturing operation, for example, the data acquisition time period may be in hours or even days. When the objective of the survey is to acquire data associated with perforating a well, the data acquisition time period is much shorter and may be measured, by way of example, in seconds or minutes.

The rate at which data are recorded for each of the channels corresponding to each of the sensors 12 and 22 may also be varied in accordance with the objectives of the survey, and the frequencies characteristic of the seismic energy generated at point of fracture 42, and seismic wavefront 44 as it propagates through subsurface 15 and to surface 8. For example, if frequencies less than or equal to 250 Hz are expected to be sensed or measured in acoustic wavefront 44, data may be sampled at a rate of 2.0 milliseconds ("ms") per channel to ensure aliasing does not occur. Other sample rates are also possible such as 0.25 ms, 0.5 ms, 1 ms, 4 ms, 8 ms, 16 ms, and so on.

It is usual to record more data than is required for a given survey objective. For example, when monitoring a fracturing operation, recording may begin several minutes before the fracturing operation is scheduled and continue until a time beyond which it is unlikely that any further energy will be released as a result of the fracturing process. Such a process may be used to record the ambient seismic field before and/or after fracturing, production, halt of production, or perforation operations.

Figure 2:
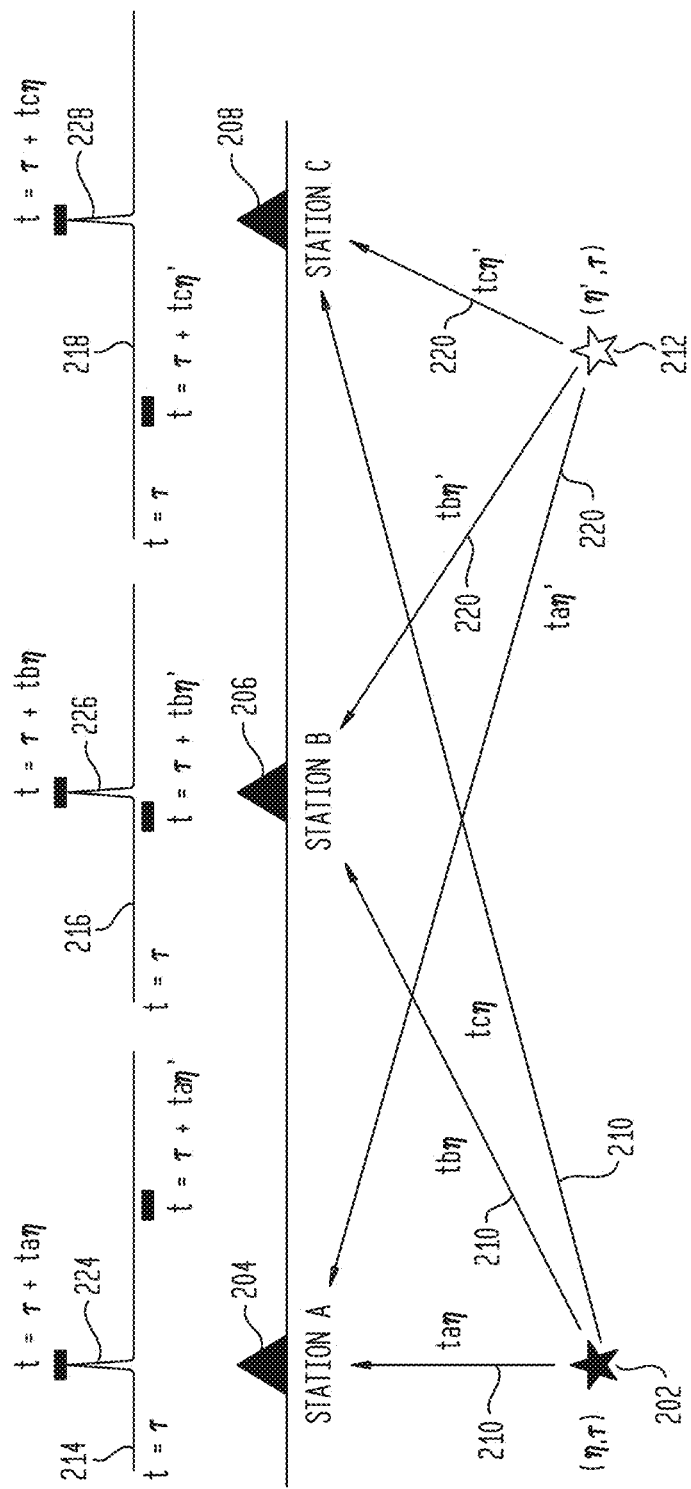
FIG. 2 shows the concept of the Source Scanning Algorithm.

Once the seismic data have been recorded, they must be processed and converted to produce a useful display of information. In at least some microseismic data processing techniques, the Source Scanning Algorithm or some variation of the algorithm is used to determine the point at which the microseismic energy originated. FIG. 2 shows one of the methods for earthquake monitoring as described in "The Source-Scanning Algorithm: mapping the distribution of seismic sources in time and space" by Honn Kao and Shao-Ju Shan, Geophys. J. Int. (2004) 157, 589-594 (hereafter "the Kao publication").

In FIG. 2, microseismic event 202 occurs at $(\eta,\tau)$ in the subsurface at point $\eta$ and time $\tau$. Seismic energy 210 from event 202 takes some time to reach surface sensors at station A 204, station B 206 and station C 208. The travel time of seismic energy 210 to station A 204 is $t_{a\eta}$, the travel time to station B 206 is $t_{b\eta}$, and the travel time to station C 208 is $t_{c\eta}$. Seismic data traces 214, 216 and 218 are recorded at station A 204, station B 206 and station C 208 respectively. As seen in FIG. 2, seismic energy 210 is recorded at station A 204 at time $t=\tau+t_{a\eta}$, at station B 206 at time $t=\tau+t_{b\eta}$, and at station C 208 at time $t=\tau+t_{c\eta}$. Seismic data traces 214, 216 and 218 are shifted in time to compensate for the travel times from point $\eta$ to each sensor. For example, trace 214 is shifted by $t_{a\eta}$ such that the energy appears at time $224=(\tau+t_{a\eta})-t_{a\eta}=\tau$. Traces 216 and 218 are shifted by $t_{b\eta}$ and $t_{c\eta}$ respectively to times 226 and 228. Now all three traces show the seismic energy at time $t=\tau$. When the traces are summed, the energy adds at time $t=\tau$. The Kao publication refers to this as the "brightness function". If the semblance values for traces 214, 216 and 218 is computed, they show a high degree of similarity at time $t=\tau$. This confirms that the microseismic event did originate at or proximate to subsurface location $\eta$ at time $\tau$.

If, however, the same process is applied at subsurface location $\eta'$, at time $\tau$, the result is different. If microseismic event 212 had occurred at $(\eta',\tau)$ in the subsurface at point $\eta'$ and time $\tau$, then the travel time for the seismic energy 220 to reach station A 204 would be $t_{a\eta'}$. Similarly, the travel times to station B 206 and station C 208 would be $t_{b\eta'}$ and $t_{c\eta'}$ respectively. Energy 220 from the microseismic event would be expected to arrive at the surface sensors at times $(\tau+t_{a\eta'})$, $(\tau+t_{b\eta'})$ and $(\tau+t_{c\eta'})$. As shown in FIG. 2, there is reduced microseismic energy at these times on the seismic traces, and whether they are summed or the semblance is computed, there is reduced indication of a microseismic event. It is therefore possible to conclude that no microseismic event 212 occurred at $(\eta',\tau)$, that is, in the subsurface at point $\eta'$ and time $\tau$. In the terminology of the Kao publication, the brightness function has a lower value at this point.

Figure 3:
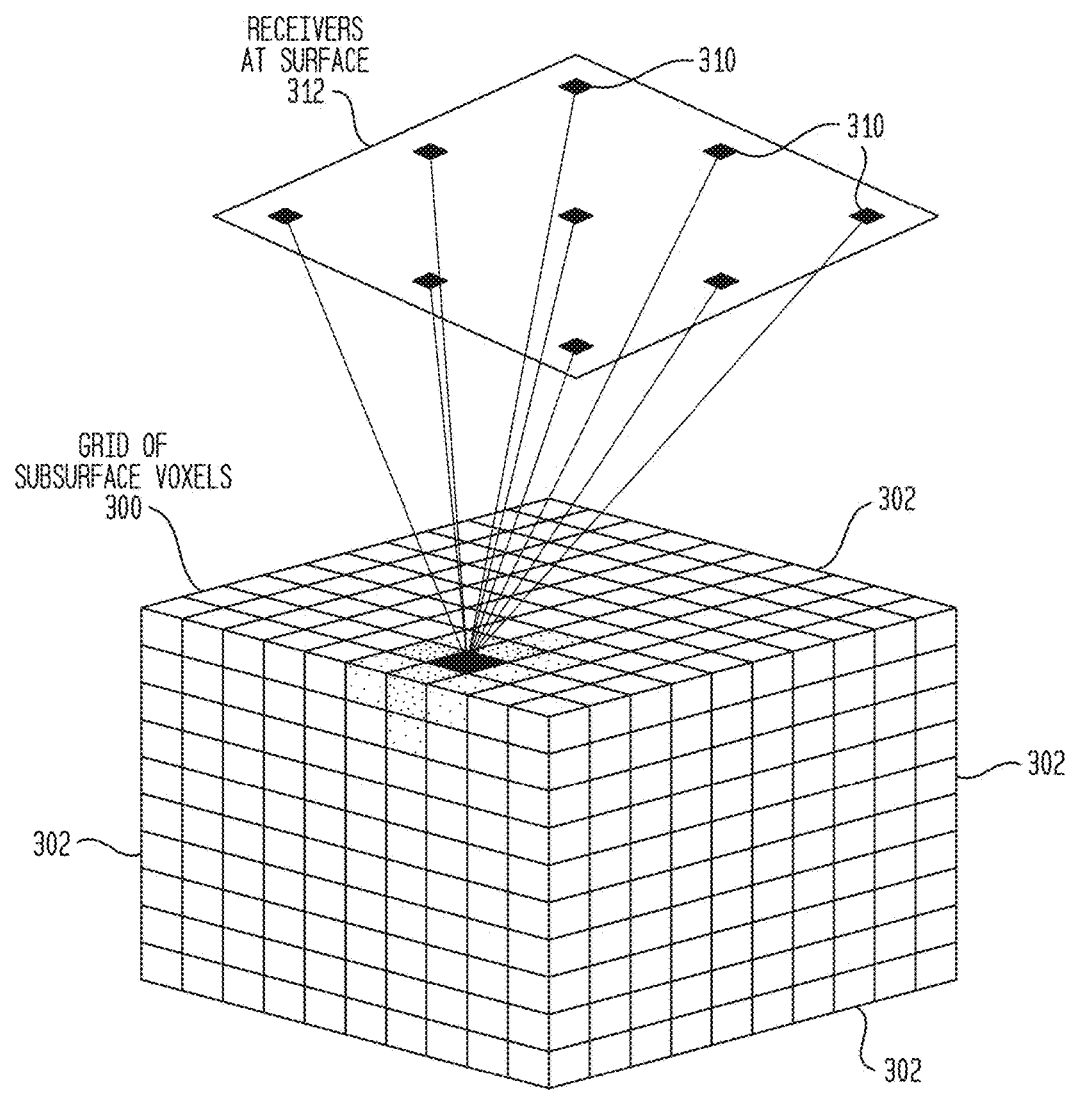
FIG. 3 shows the subsurface grid of voxels and surface receivers for the Source Scanning algorithm.

As shown in FIG. 3, the method used in the Source-Scanning Algorithm (SSA) is to examine a volume of the subsurface over a selected time interval, looking at points in the subsurface to see if a microseismic event could have originated at that point. The subsurface of the earth is divided into a three-dimensional grid 300 containing elements 302 which are referred to as "voxels". Just as a "pixel' is an element within a two-dimensional area, a "voxel' is an element within a three-dimensional volume, each cell or voxel within the grid representing a possible location of the source of a microseismic event.

Data are recorded at N sensors 310 on surface 312 as a series of times and amplitudes, the time series for each sensor being referred to as a "trace". The time values correspond to the time at which the seismic energy arrived at the sensor, which must be later in time than when the seismic energy was emitted from the source in the subsurface. Using a known or estimated velocity model, the travel time and travel path from the voxel to each sensor is computed for each voxel in the subsurface grid. A set of data is selected, corresponding to a chosen time interval. For each voxel in the subsurface grid, the trace recorded at each of the N sensors 310 has the appropriate travel time shift applied to it. Thus the seismic energy for each trace is corrected in time to the time when it was emitted. The result is a set of N traces which may be considered to have originated at this voxel. These traces are then summed together.

If a microseismic event did originate at this voxel, then the resulting summed trace will show the event as having a higher amplitude than the individual traces. If no microseismic event occurred at this voxel, then the resulting summed trace will show the random background noise. This process is repeated for each voxel in the subsurface volume of interest. The entire process may be repeated for multiple time intervals to show the temporal changes in the microseismic events.

In other implementations of the source scanning method, the semblance of the N time-shifted traces is computed. The semblance function shows the similarities between traces, and has a high value if a seismic event originated at the voxel, and a low value if there is nothing more than random background noise at this voxel. The result is a representation of the subsurface for the selected time interval showing where microseismic events may have occurred. Yet other implementations use different attributes of the data.

Other approaches to determining the origins of microseismic events are described in "Realtime Earthquake Location Using Kirchhoff Reconstruction", Teresa Baker, Robert Granat and Robert W. Clayton, Bulletin of the Seismological Society of America, Vol. 95, No. 2, pp. 699-707, April 2005. This paper describes the use of a Kirchhoff Migration technique to image microseismic events. U.S. Pat. No. 6,389,361, "Method for 4D permeability analysis of geologic fluid reservoirs" to Geiser, and U.S. Pat. No. 7,127,353, "Method and apparatus for imaging permeability pathways of geologic fluid reservoirs using Seismic Emission Tomography" to Geiser discuss generating 4-dimensional models of the microseismic data, using tomographic processing techniques. U.S. Pat. No. 7,391,675 for "Microseismic event detection and location by continuous map migration" to Julian Drew describes a hypocenter approach to determining the locations of microseismic events. All of these approaches rely on imaging the microseismic energy detected at the surface back to its point of origin in the subsurface.

While various algorithms may be used to transform the acquired data, the end result is typically the same: a series of spatial volumes are produced, where each spatial volume is associated with a given data subset, and each data subset corresponds to a given time window. The values corresponding to the voxels within the spatial volume represent the amount of energy emitted from each voxel during a given time window. The energy emitted from each voxel during a given time window may be represented by different attributes of the data, including, but not limited to, semblance, amplitude, absolute amplitude, reflection strength (the amplitude of the envelope of the seismic wave), phase, frequency, and other attributes of seismic data which will be apparent to those skilled in the art.

Typically the energy released during hydraulic fracturing is of a very low level, usually below zero on the Richter scale, hence the amount of energy that reaches the surface and is detected by the surface sensors is extremely small. The very weak signals can be masked by noise of various types, which may have amplitudes several times that of the microseismic energy. Noise contamination may include surface waves, refracted waves, and reflected waves, that is, seismic energy from surface noise sources that is transmitted into the earth and reflected back from within the subsurface. The noise contamination may include combinations of different types of noise.

Figure 4:
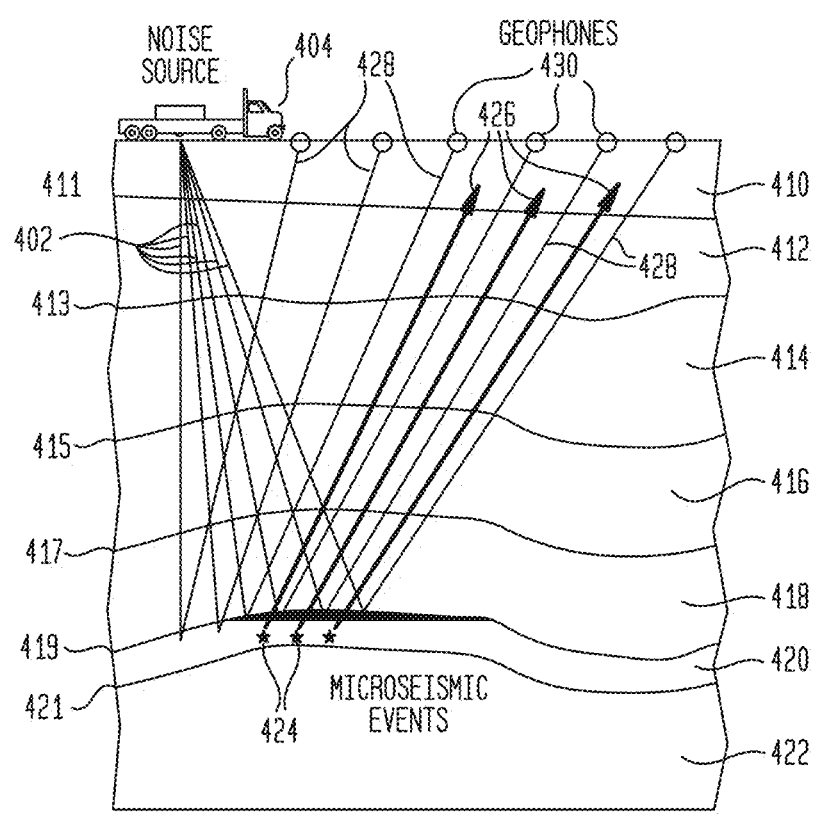
FIG. 4 shows reflected noise arriving at the surface at angles of incidence very close to that of energy from microseismic events.

As shown in FIG. 4, noise waves 402 are emitted by a surface noise source 404 such as a vehicle, a pump, a generator, or many other sources of noise present in the area. A typical hydraulic fracturing operation involves trucks bringing water and proppants to the drill site, powerful hydraulic pumps, and other heavy equipment. There may be more noise sources at locations other than the drill site, some of which may be on the surface directly over horizontal wellbore 60 or offset some short distance from it. Microseismic events 424 occur in geologic formation 420, and seismic energy 426 from these events reaches surface sensors 430. Noise waves 402 from surface noise source 404 may be reflected from interfaces 411, 413, 415, 417, 419 and 421 between geologic formations 410, 412, 414, 416, 418, 420 and 422. For simplicity in FIG. 4, only noise waves 428 reflected from interface 419 are shown. Reflected noise waves 428 reach surface sensors 430 at a similar angle of incidence as seismic energy 426 from microseismic events 424. This makes reflected noise waves 428 essentially impossible to separate and remove from microseismic data by conventional methods. Such noise contamination can lead to the false identification of noise as microseismic events, or it can result in some valid microseismic events not being observed at all.

Figure 5:
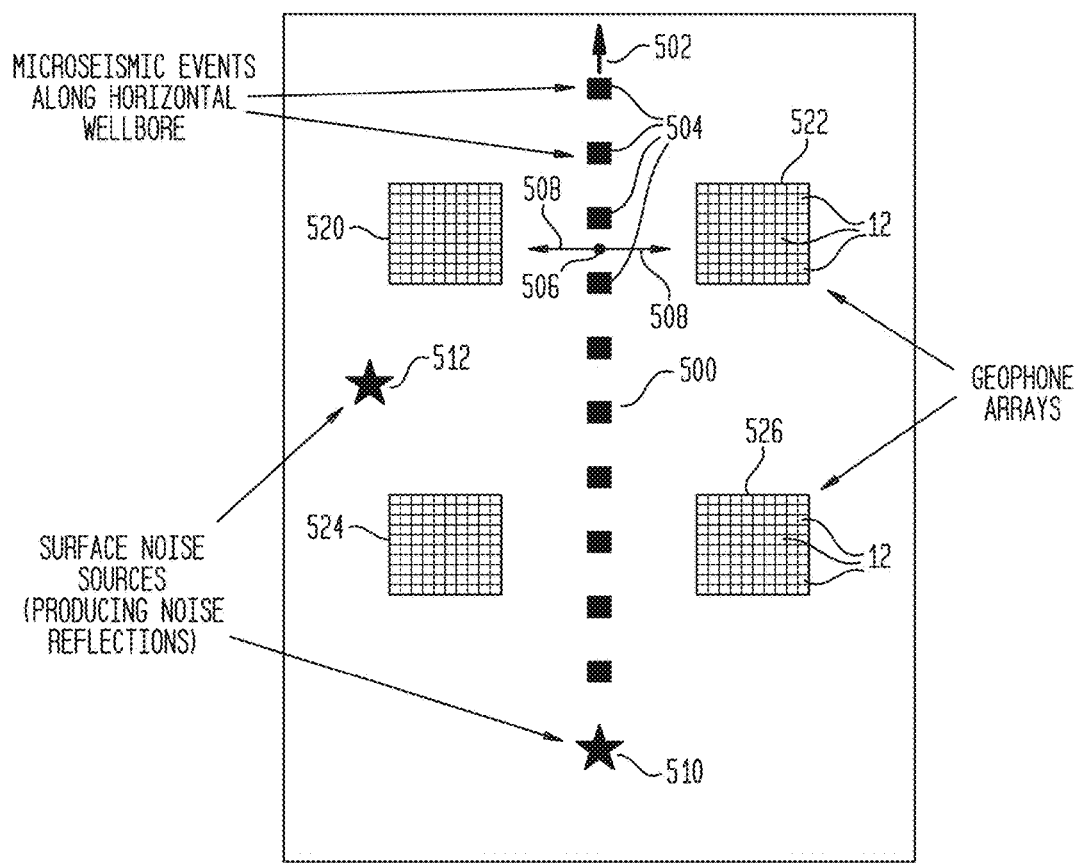
FIG. 5 shows one embodiment of a microseismic patch data acquisition array.

Referring now to FIG. 5, this shows a map perspective view of an example of one embodiment of a proposed microseismic data acquisition array. In many instances where microseismic data are acquired for monitoring hydraulic fracturing, sensors 12 are arranged in a manner similar to that used in conventional seismic surveys. Frequently sensors 12 are arranged in parallel lines with the spacing between the parallel lines being comparable to the in-line spacing between the sensors. The result is a grid of substantially evenly spaced sensors, which requires a large number of sensors. In order to reduce the number of sensors required to survey a given area, the sensors may be moved to different locations within the survey area, the sensors being arranged proximate the seismic source. Limiting the number of sensors in this way also keeps within reasonable limits the number of individual data channels that must be recorded and processed.

This recording geometry works well for conventional seismic data but is less applicable to microseismic data, where the location of the source is less predictable. In a fracturing operation, the subsurface location where the fracturing fluid is being injected into the formation is known, and therefore the locations of the resulting microseismic events can be assumed to be within some reasonable distance from the injection point. However, fracturing may also occur at some distance from the injection point. Horizontal wellbore 60 may extend up to two miles horizontally from vertical wellbore 30, and there may be up to twenty fracture operations performed at different points along horizontal wellbore 60. Further, the effects of the hydraulic fracturing process may result in seismic energy being released for some time after the process has been completed, adding uncertainty to the source location of a microseismic event and making it impractical to move the sensors. In some embodiments, the sensors are buried, and may even be cemented in shallow boreholes, in which case they are left in place for use in future surveys. These methods all cover large spatial areas and require large numbers of sensors.

Another problem with these conventional data acquisition geometries is that they may include energy arriving at the sensor from all directions without discrimination. Referring back to FIG. 3, it is obvious that energy from a given voxel arrives at a receiver at an angle of incidence that is dependent on the relative positions of the voxel and the receiver. The same can be observed in FIG. 2, where seismic energy 210 arrives at Station A 204 at a very different angle of incidence from that of seismic energy 220. Time shifting and summing all the data at a given voxel includes noise or microseismic energy that may have originated elsewhere, possibly leading to false positive results at the voxel.

Some conventional data acquisition geometries are configured with a sensor spacing such that noise is attenuated, because the noise arrives at different sensors at different times, and the noise cancels out when the data from different sensors are summed. This can work well in attenuating noise such as ground roll associated with a known seismic source location. However, there are several problems with this approach as applied to microseismic data. First, the noise may arrive from different directions. A square or rectangular grid may have a sensor spacing tuned to eliminate noise of a selected wavelength, but it is not as effective against noise of different wavelengths. Further, noise arriving at an angle to the sensor grid sees a different sensor spacing, and thus different wavelengths of noise are attenuated, depending on the direction of the noise source. Finally, the microseismic data are time-shifted before being summed, which may cause the noise to add rather than cancel, producing false indicators of microseismic events.

The present system and method avoid these problems in some embodiments by selecting a spacing of the sensor arrays such that noise is adequately sampled rather than attenuated. The present method also in some embodiments applies software filters to the data to exclude incoming seismic energy with an inappropriate angle of incidence. If the filter is designed with the correct parameters, it is possible to eliminate noise arriving at the sensor at an angle of incidence that is closer to that of the real microseismic energy than is possible using conventional methods. The effect of the filter is to impart a directionality to the sensors, such that they "listen" in the direction of a point in the subsurface as that point is being evaluated as a possible source of microseismic energy.

FIG. 5 shows one embodiment of a system for determining locations of microseismic events below surface 8. Microseismic event generator 500 disposed along first axis 502. Microseismic event generator 500 may be a horizontal wellbore or it may be a fault or fracture. Microseismic events 504 occur along microseismic event generator 500. The illustrated array geometry avoids the problems described above by using a plurality of surface sensors 12, usually geophones, deployed in a plurality of grids 520, 522, 524, 526, referred to as "patches". In some embodiments, the patches are disposed on either side of microseismic event generator 500, to enable trilateration of microseismic events. Surface sensors 12 within the patches are positioned in a regular grid and having spacing between sensors such that common forms of noise are not aliased. In some embodiments, one dimension of patch 502 has a width of only one sensor, such that patch 502 forms a line segment.

The dimensions of the patch are designed such that the noise is recorded with at least two regular samples per wavelength in three dimensions (time, spatial x and spatial y). Some aliasing can be tolerated, provided that the aliased noise does not contaminate the portions of the frequency/wavenumber/wavenumber spectrum that are used for microseismic event detection. Mathematical modeling shows that for typical forms of noise such as air waves and ground roll, good results can be expected with a 140×140 meter patch with 7 meter spacing between sensors. Therefore each patch requires 21×21=441 sensors.

The precise location and orientation of the individual patches is not critical, provided that the patches are distributed generally above microseismic event generator 500 in a manner that allows accurate trilateration of microseismic event locations. For accurate trilateration of microseismic event locations at least three arrays are required. In some embodiments more than three arrays are employed, so that noisy arrays can be discarded during source scanning without reducing the number of usable arrays to fewer than three. Thus the use of patches allows the accurate identification and location of microseismic events over a large area without requiring that a large area be covered in sensors. Further, microseismic events do not radiate energy equally in all directions, because the initial motion of the event involves slippage of a fracture. The relative motion on each side of the fracture is in opposite directions, giving rise to both compressional and tensional microseismic waves, which combine to produce a directional pattern of energy radiation. Using more than three patches allows for the possibility that some of the patches fall in a nodal plane in the radiation pattern of a microseismic event and therefore do not detect any seismic energy.

In some embodiments patches 520, 522, 524, 526 are positioned on the surface substantially symmetrically about horizontal wellbore 60, and in some embodiments a plurality of patches 520, 522, 524, 526 are aligned substantially parallel to horizontal wellbore 60, as shown in FIG. 5, enabling accurate trilateration of microseismic events occurring during the hydraulic fracturing process of horizontal wellbore 60. In further embodiments the patches are located at a substantial horizontal distance from microseismic event generator 500 in order to achieve better depth resolution of the locations of the microseismic events.

Continuing to refer to FIG. 5, microseismic events 504 occur along microseismic event generator 500 during and after the hydraulic fracturing operation. Data from these microseismic events are recorded at patches 520, 522, 524, 526. Surface noise sources 510, 512 create noise that is received and recorded at patches 520, 522, 524, 526, including air waves, ground roll, and reflected noise. In order to accurately identify and determine the locations of microseismic events 504, the effects of the noise must be removed. In some embodiments of the system, this is done by an analyzer, of which more will be said below. The analyzer applies filters to the microseismic data from each patch to impart a directionality to the data. The effect of the filtering on the microseismic data is to simulate each patch receiving data only from within a narrow beam directed at a small volume of the subsurface. This result is achieved by transforming the data into its corresponding frequency/wavenumber/wavenumber spectrum, filtering the data, and then applying the inverse transform to return the data to the time and spatial domain. One embodiment described below uses a transform algorithm that is a 3-dimensional Fourier (FKK) transform. An FKK (frequency/wavenumber/wavenumber) transform is a Fourier transform performed in three dimensions: from time to frequency, from a first spatial domain to a wavenumber, and from a second spatial domain to a wavenumber. In other embodiments, different transform algorithms can be used, including tau-p and Radon transforms, as will be understood by one of ordinary skill in the art after reading this description. The design and application of the filters is described below.

In the embodiment shown in FIG. 5, first axis 502 is shown for convenience as 0 degrees. Microseismic event 506 releases seismic energy 508 that arrives at patch 520 at an azimuth of about 270 degrees, varying with the relative positions of microseismic event 504 and patch 520. Seismic energy 508 arrives at patch 522 with an azimuth of about 90 degrees. Noise generated at surface noise source 512 and reflected from subsurface layers arrives at patch 520 at an azimuth of about 190 degrees. When the source scan algorithm is applied using a conventional approach, the source scan for voxels proximate the microseismic event 506 includes data arriving from all directions. In the embodiments described herein, the source scan performed for voxels proximate microseismic event 506 includes only data arriving at patch 520 at an azimuth of 270 degrees, at patch 522 at 90 degrees, and at other patches using the appropriate directionally filtered data. Thus the filtering reduces the noise while allowing the accurate trilateration of the microseismic event.

FIG. 6A shows modeled microseismic data 602 such as would be recorded at a patch from a microseismic event occurring at microseismic event generator 500. The model assumes that no noise is present. The data were created using finite difference mathematical modeling, which will be known to one of ordinary skill in the art. The horizontal axis is the horizontal distance from the event location, and the vertical axis is time. FIG. 6B shows the same microseismic data 602, modeled using full wavefield modeling with the addition of a typical level of noise. The data from the microseismic event are totally masked by the noise. Further, there are some alignments of noise energy that could possibly be misidentified as microseismic events.

FIG. 7A shows in chart 700 data similar to that of FIG. 6B, that is, mathematically modeled seismic data containing microseismic event 702 and various forms of noise 704, after an FKK transform. Chart 700 is in the frequency-wavenumber-wavenumber domain, but is shows as a two-dimensional frequency-wavenumber slice. FIG. 7B shows the same data in chart 720 as a constant frequency slice, corresponding to dotted horizontal line 710 in FIG. 7A. Diagonal line 722 in FIG. 7B corresponds to the frequency-wavenumber slice data shown in FIG. 7A. FIG. 7B shows that microseismic event 702 and noise 704 have substantially similar characteristics, but can be distinguished in the FKK transform domain.

Figure 8B:
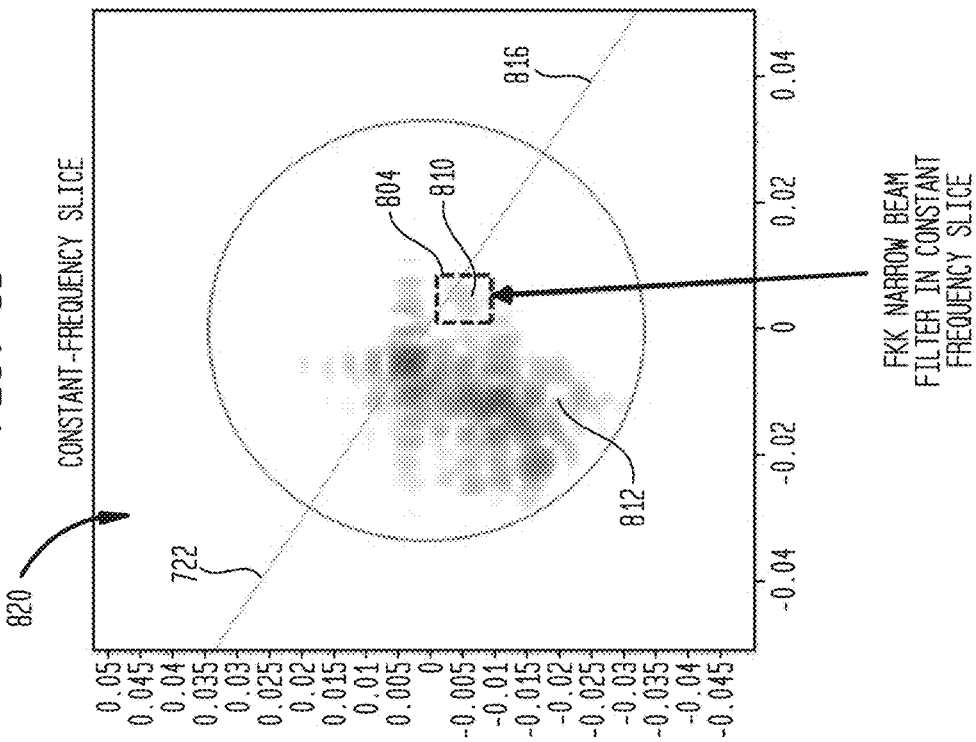
FIG. 8B shows a constant frequency slice of an FKK narrow beam filter applied to the FKK transformed data.
Figure 8A:
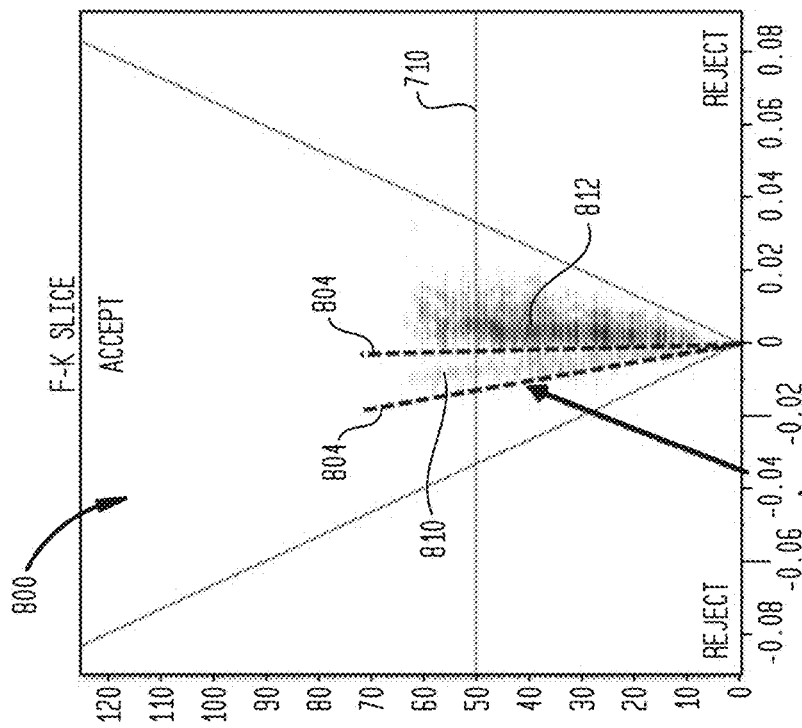
FIG. 8A shows a frequency-wavenumber slice of an FKK narrow beam filter applied to the FKK transformed data.

In FIGS. 8A and 8B, chart 800 shows narrow beam filter 802 applied to the FKK transformed data. Data are transformed into the FKK domain, data values in some portions of the FKK domain are attenuated or set to zero, and the data are converted back through an inverse transform into the original time and spatial domains. Filter 802 is shown in the frequency-wavenumber slice in FIG. 8A, and in the constant frequency slice in FIG. 8B. Heavy dashed lines 804 represent the boundaries of the FKK filter, such that data samples 810 inside the boundaries are unchanged, and data samples 812 outside the boundaries are attenuated. In this example, attenuating the data samples outside of the filter boundaries greatly reduces the noise while passing the microseismic event virtually unchanged. The extent of the FKK filter can be quite limited, and it is therefore referred to as a "narrow beam" filter.

If data in the filtered zone are set to zero, and data in the unfiltered zone are passed unchanged, the abrupt transition at the edge of the filtered zone may cause unwanted artifacts in the output data. In order to reduce the creation of artifacts by the filtering, the filter can be "tapered" by designing a smooth transition from the filtered zone to the unfiltered zone.

The effectiveness of the systems and methods described herein is demonstrated in FIGS. 9A, 9B and 9C. FIG. 9A shows data 602 corresponding to the mathematically modeled microseismic event, without any noise. FIG. 9B shows the same microseismic data but with noise added to the modeling algorithm. FIG. 9C shows the modeled microseismic data after the application of the narrow beam FKK filter to the data of FIG. 9B. Although there is some residual background noise, data 602 from the microseismic event can be clearly seen. The degree of effectiveness of the FKK filter is directly related to how well the FKK filter can be designed to reduce the noise without adversely affecting the data from real microseismic events.

Previous approaches to processing microseismic data and identifying microseismic events relied on selecting a voxel, and then time-shifting and stacking or summing all of the data for each source point to determine if the microseismic energy originated at that voxel. However, the data from each source point also contains noise, which typically is assumed to cancel out, but in practice often does not. Random background noise emanating from the subsurface of the earth may cancel, but noise from a surface source such as a pump or a truck does not cancel well. Noise recorded at a patch may have originated from a point in the subsurface proximate the horizontal wellbore, but it is more likely that it came from some other direction.

In the present method, the microseismic data are analyzed to determine if a microseismic event occurred at a given voxel. In some embodiments of the method, prior to such analysis, the data recorded at each patch are filtered to eliminate noise arriving at each patch from a direction other than along a narrow beam centered on the travel path of the seismic energy from the voxel to the patch.

In order to design an appropriate filter, in some embodiments the voxel grid is subdivided into a set of subgrids, each subgrid being a multiple of the voxel size. A filter is then designed for each combination of subgrid and patch. The filter is designed and applied, and a source scan implemented to locate microseismic events, using the following steps as shown below in in one embodiment in FIG. 10, as applied to a predetermined microseismic data set corresponding to a subsurface are of interest:

1. Determine the full voxel grid for the subsurface volume of interest as in conventional microseismic source scanning;

2 Specify voxel subgrids within the full grid, the size of the subgrid being based on the FKK spectrum of observed noise, and constrained by the available computing resources;

3. For each subgrid:

a. Mathematically model hypothetical microseismic events from the corners of each subgrid for each patch;

b. Transform the modeled data to the FKK domain;

c. Determine the extent of each unique FKK sub-grid filter cone;

d. Filter data for each patch using the following steps;

i. Transform microseismic data to the FKK domain;

ii. Zero all samples except those within the FKK patch-subgrid cone, with tapering at the edges of the cone;

iii. Transform data back to the time-space domain e. Combine the filtered microseismic data from all the patches, possibly discarding data from some arrays;

f. Perform a conventional source scan on the filtered data, on all voxels within the subgrid;

4. Combine the source scanning results from all subgrids to produce the final results.

Figure 10:
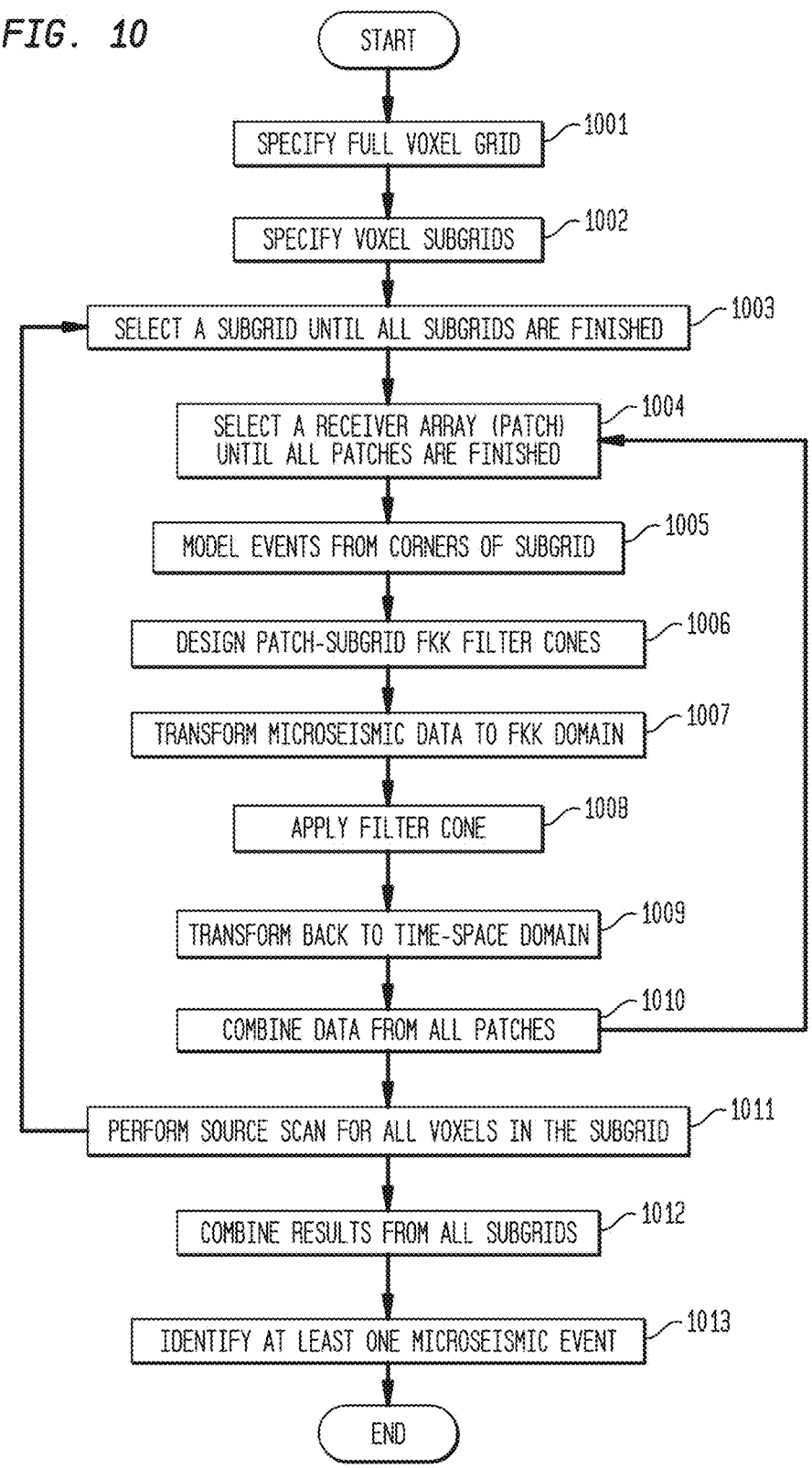
FIG. 10 shows a flow chart for the design and application of FKK filters.

At step 1001 in FIG. 10, the subsurface volume of interest is selected and divided into a grid of voxels. The size of the voxels is chosen based on the size necessary to accurately determine locations of microseismic events. The smaller the voxel, the finer the detail which may be distinguished in the subsurface, and therefore the locations of the microseismic events may be determined more accurately. However, increasing the number of voxels increases the computing time required to process the data.

The voxel subgrids are specified at step 1002. The size of the subgrid is determined by the spectrum of the noise observed in the microseismic data, such that the noise can be adequately sampled and removed. The size of the subgrid is also constrained by the available computing power. In some embodiments where the results must be provided in close to real time, a coarse subgrid may be used. In other embodiments where the time constraint is less critical, a fine subgrid can be used to increase accuracy.

At step 1003, each subgrid is selected and processed using the following steps until all the subgrids with the full voxel grid have been processed.

For each subgrid, at step 1004 the data corresponding to a patch are selected, and the following steps applied until the data from each patch have been processed for this subgrid.

At step 1005, a model is created with hypothetical microseismic events at the corners of each subgrid. The model shows the microseismic data that would be received at the sensors in the patch if a microseismic event occurred at these locations. The modeled microseismic data therefore represent the boundaries of the microseismic energy that could have its origins within the subgrid. The data recorded at the patch from the subgrid have a limited range of angles of incidence, based on the relative locations of the subgrid and the patch, the composition of the subsurface, the velocity of seismic waves through the different subsurface layers, and other factors that will be understood by one of skill in the art after reading this description.

At step 1006, the modeled data are transformed. In some embodiments an FKK filter is applied to convert the data to the frequency-wavenumber-wavenumber domain. In other embodiments, a Tau-p or Radon transformation can be used. A filter cone, such as previously shown in FIG. 8*a*, is designed to pass the microseismic energy while rejecting noise. A unique filter cone is designed for each combination of subgrid and patch.

The microseismic data are transformed at step 1007 using the same type of transform as was used in step 1006 to transform the modeled data. At step 1008, the data are filtered by applying the filter cone designed in step 1006. Applying the filter cone sets to zero all samples except those within the patch-subgrid filter cone. The filter cone may be tapered, so that there is not an abrupt transition from data being passed unchanged to data being set to zero. Such an abrupt transition could introduce unwanted artifacts into the data. Then at step 1009, the data are transformed back to the time-space domain using the inverse of the transform applied in step 1007.

At step 1010, the filtered data from all the patches are combined to create one data set for this subgrid. The data from each patch now contain microseismic energy with a limited angle of incidence, and combining the data from a plurality of patches at different locations provides a data set for the subgrid containing microseismic energy with multiple angles of incidence, and with the noise levels reduced. What differentiates these embodiments from previous approaches is that the sensors in the patches are now effectively listening only in the direction of the subgrid.

Therefore when the source scan is performed at step 1011, any microseismic events observed within the voxels of the subgrid can be relied upon with a higher level of confidence than events detected or shown by other methods.

Once the results are available for each subgrid, the results are combined at step 1012, to create an image of the microseismic events within the entire voxel volume. The result is a set of possible locations in space and time for the origins of microseismic events. These results may be displayed as a three-dimensional model on a computer screen, or printed as two dimensional projections. Further processing steps may include identification of clusters of microseismic events at step 1013 and analysis of the volume of the fracture zones, and analysis of the radiation pattern and direction of first motion of the microseismic events.

Figure 11:
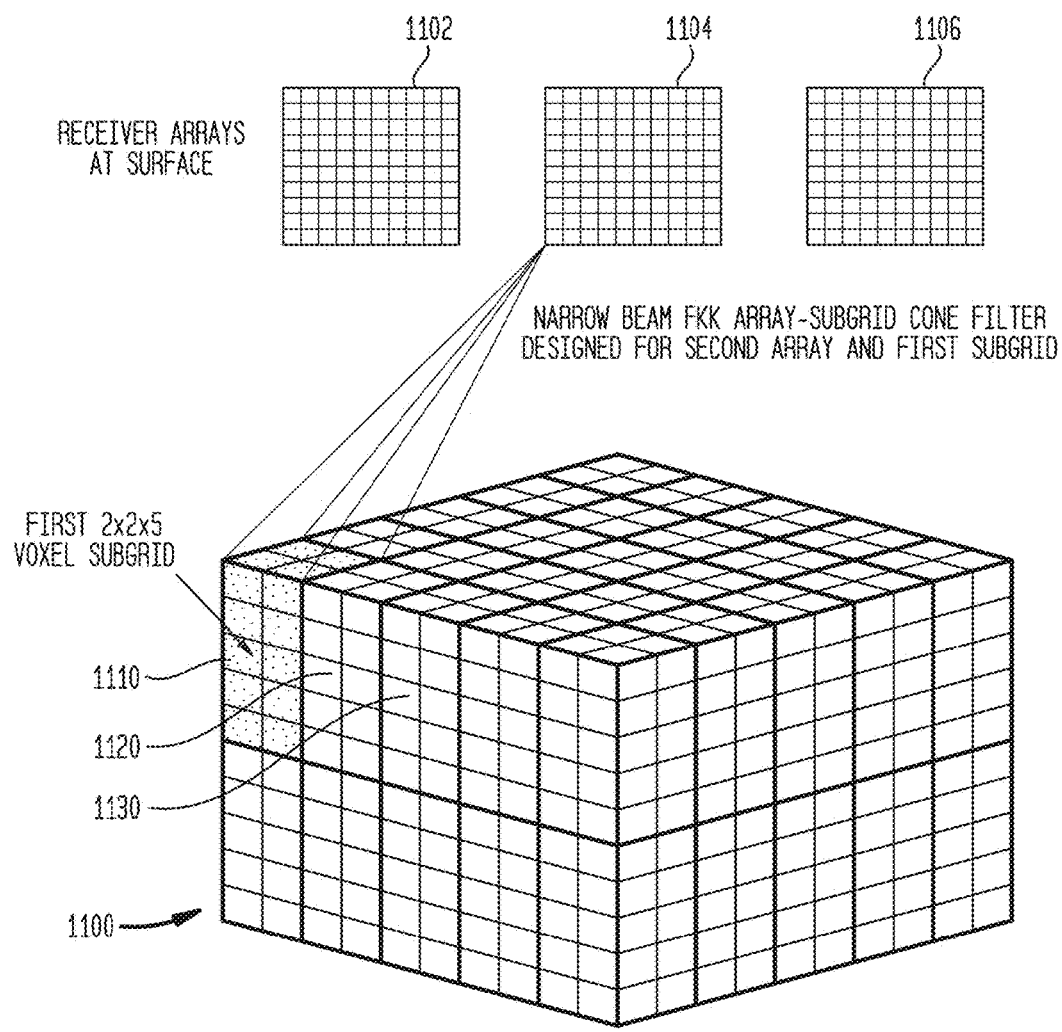
FIG. 11 shows an embodiment of a narrow beam scan of a first voxel subgrid for a second patch.

To further illustrate the pairing of the patches with the voxel subgrids, FIG. 11 shows an embodiment of the narrow beam scan of the first voxel subgrid for second patch 1104. Data are recorded at a plurality of patches 1102, 1104, 1106. An area of interest in the subsurface is divided into voxel grid 1100, and subgrids 1110, 1120, 1130 are specified within voxel grid 1100. In this example of the embodiment the size of each subgrid is 2×2×5 voxels. In FIG. 11, data from patch 1104 are filtered, using a filter designed for patch 1104 and subgrid 1110, such that the energy from subgrid 1110 is passed by the filter and other energy, including noise, is attenuated. The process is repeated for patches 1102, 1106, using filters designed for the combination of each patch and subgrid 1110. The result of the filtering is that the output data for each patch now contains only microseismic energy originating in subgrid 1110. The data from the patches are combined, and a source scanning algorithm applied to determine if microseismic events originated in subgrid 1110.

Figure 12:
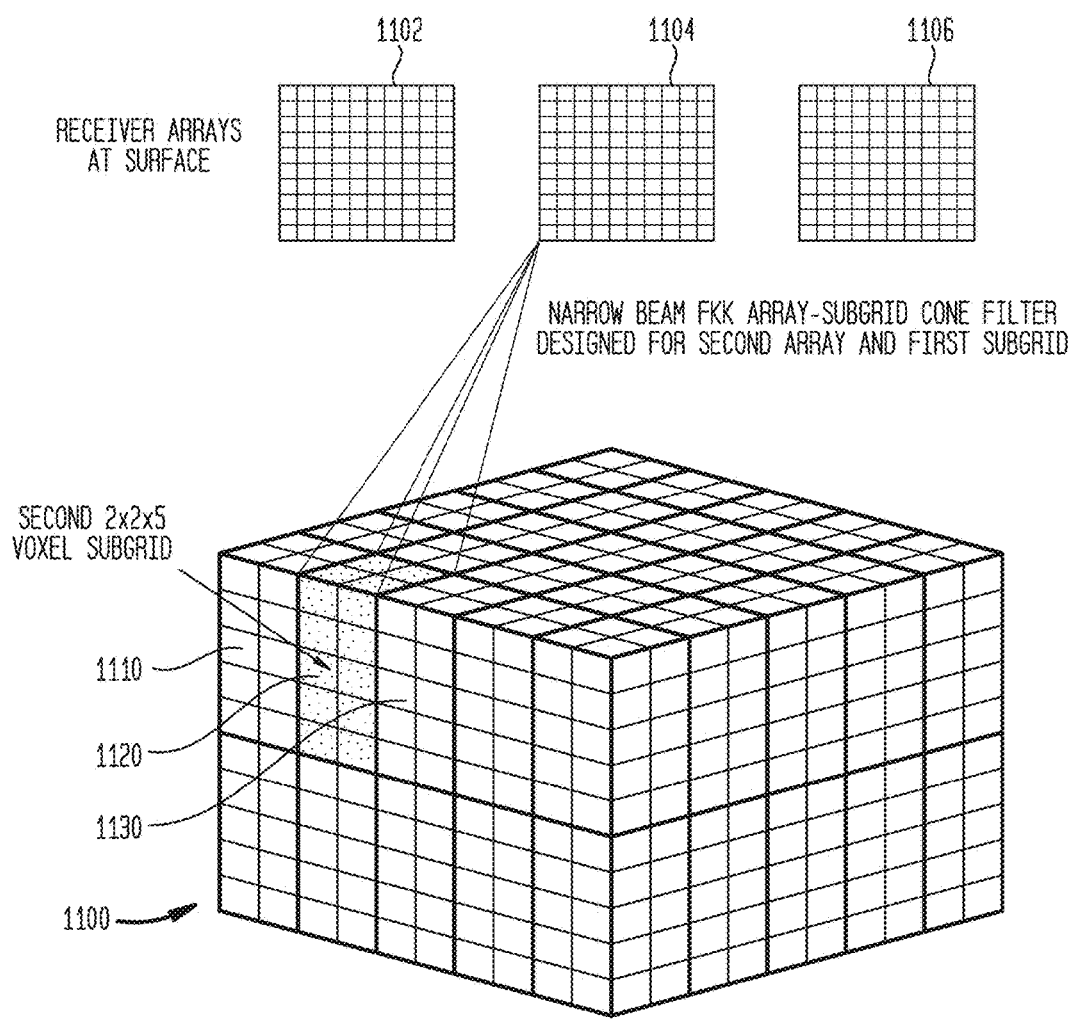
FIG. 12 shows a narrow beam scan for a second voxel subgrid for a second patch.

FIG. 12 shows the narrow beam scan for second voxel subgrid 1120 for second patch 1104. The data from patch 1104 are filtered, using a filter designed for patch 1104 and subgrid 1120, such that the energy from subgrid 1120 is passed by the filter and other energy, including noise, is attenuated. Again, the process is repeated, filtering data from patches 1102, 1106 with the appropriate filters, summing the data, and scanning for microseismic events within subgrid 1120.

It can be seen from FIGS. 11 and 12 that using a unique filter for each subgrid-patch combination has the effect of causing each patch to follow or track the subgrid through the subsurface volume as the analysis proceeds from one subgrid to the next.

In some embodiments, only one subgrid is used, with the subgrid being the same as the full grid. Such embodiments might be used, for example, where other information suggests the origin of a microseismic event to within a small range of times and spatial locations. A small voxel grid is defined to cover the possible locations of the event, and the methods described herein are used to further refine the exact origin of the event.

In embodiments where data have already been recorded using sensors covering a large area, the data can be sampled to extract a sub-set of data corresponding to a plurality of patches in predetermined locations. The use of simulated patches allows the design and application of filters to provide directional listening capability as discussed above.

Methods of microseismic event detection have been developed to use various different geometries, such as a star array, sometimes referred to as a radial array. See U.S. Pat. No. 6,868,037 "Use of drill bit energy for tomographic modeling of near surface layers" to Dasgupta. Frequently the star is centered on the well, meaning that it has good resolution close to vertical wellbore 30, and increasingly poor resolution at the large horizontal distances from vertical wellbore 30 at which the hydraulic fracturing is taking place in horizontal wellbore 60. Further, when new wells are drilled, this array has to be duplicated, centered on each new well. The main reason for using a star array is that some degree of 2-D filtering may be achieved in order to reduce the noise coming from the center of the array. The center of the array is usually the pad from which the vertical wellbore is drilled, and during a hydraulic fracturing operation is a major source of noise from the various pumps, vehicles, and other heavy equipment needed for the hydraulic fracturing. However, the star array, and 2-D filtering, is less effective when the noise comes from multiple directions, which is normally the case.

In some embodiments of the present method, it is possible to consider the data from the star array as if it were recorded in patches. A segment of an arm of the star array may be regarded as a patch of a given length and a width corresponding to one sensor. For example, instead of the previously described 21×21 sensor array with a 7 meter spacing, for a 140 meter by 140 meter patch, a segment of the arm of the star can be used, forming a patch of sensors, 100-220 meters long and 0 meters wide. Selecting data from several such segments proximate to the horizontal wellbore and disposed on either side of the horizontal wellbore simulates recording with patches of sensors, and allows the processing of the data using the embodiments described above, with the benefit of being able to filter out the noise. The limitation of this embodiment is that the filters are limited to 2-D filters, which cannot handle noise coming from out of the plane of the segment as well as a 3-D filters would.

Figure 13:
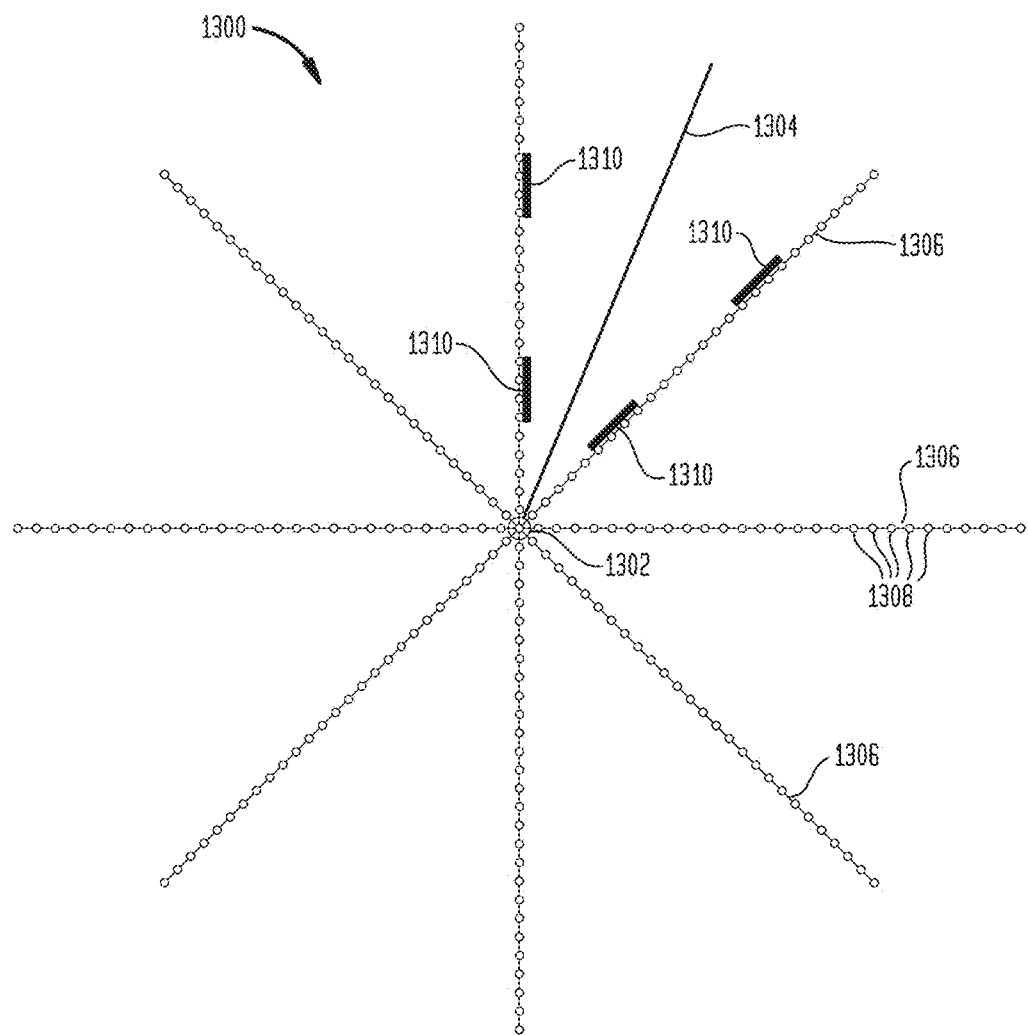
FIG. 13 shows the applicability of some embodiments to a star array.

FIG. 13 shows a star array 1300 centered on vertical wellbore 1302. Horizontal wellbore 1304 has been drilled out from vertical wellbore 1302. The star array 1300 has a plurality of arms 1306, each arm 1306 containing a plurality of sensor positions 1308. In some embodiments of the proposed method, data recorded by sensors 1308 within segments 1310 of the arms 1306 are processed using the methods described above. These embodiments add the directional listening capability to the data previously recorded in the star array, enhancing the results and producing a result with fewer false microseismic events and a higher confidence factor for the microseismic events that are identified. The 3-D filtering techniques of the method described herein are much more effective against noise than the 2-D filtering of conventional star array processing.

In some embodiments of the method described herein, a plurality of autonomous surface sensors are also distributed around the area of interest. The data collected from these autonomous sensors may be used to examine the full radiation pattern of large events. Analysis of the radiation pattern of a microseismic event can provide useful information about the direction of movement of the event and hence about the direction of stress and the direction of fractures within the sub-surface.

In some embodiments of the method described herein, the method can be used to improve the confidence in the x, y spatial locations of events detected in microseismic data recorded downhole, or in deep boreholes drilled for the purpose of placing sensors. These data are known to suffer from accuracy problems. See "Comparison of simultaneous downhole and surface microseismic monitoring in the Williston Basin", David E. Diller and Stephen P. Gardner. See also "Comparison of surface and borehole locations of induced seismicity", Eisner et al., Geophysical Prospecting, Volume 58, Issue 5, 809-820, September 2010. In particular, when microseismic events are detected in a single borehole, the determination of the azimuth from the source to the sensors may contain errors or uncertainties. For this reason, some borehole microseismic surveys employ two boreholes. Using some embodiments of the method described herein, it may be possible to employ relatively few patches to resolve these inaccuracies, in some instances as few as two patches, because the borehole data can be included in the trilateration process.

Further, in some embodiments the voxel subgrid can be constrained to only include the area near an x, y spatial location and known time for a possible microseismic event derived from the borehole data, and the voxel subgrid can be relatively small. This allows the design of a very tight filter cone in the transform domain, and hence produces very strong noise attenuation. Starting with the results from the borehole data, in which the exact time of at least one microseismic event is known, together with an approximate location, limits the subsurface volume that must be searched for the origins of the microseismic event and thus reduces the computing time required. The largest savings in computer time is achieved by knowing the time of the microseismic event.

Some previous approaches to filtering noise from microseismic data have applied FKK filtering to the entire data set. That is, the data set is transformed, filtered, and transformed back. A single FKK filter is applied to all of the data. This approach does reduce some noise, but the output data may be adversely affected when there are noise bursts or spikes in the data. A large noise burst may leak through the filters, because it essentially contains all dips. One benefit of the embodiments of the method described herein is that independent filters are applied to each patch of receivers, or each segment of a line of receivers, so that a large noise burst with characteristics that cause it to leak though the filter for one patch/segment does not contaminate the filtered data in the next patch/segment. This aids in the recognition of real events versus false events, because the effect of a noise burst is limited to a subset of the data.

Embodiments of the method described herein can be used applied to either compression-wave or shear-wave microseismic data. When modeling the hypothetical microseismic events at the corners of each subgrid, the modeling must take into account the type of microseismic data and use the appropriate velocity model, as the different types of seismic wave propagate through the subsurface at different velocities.

Figure 14:
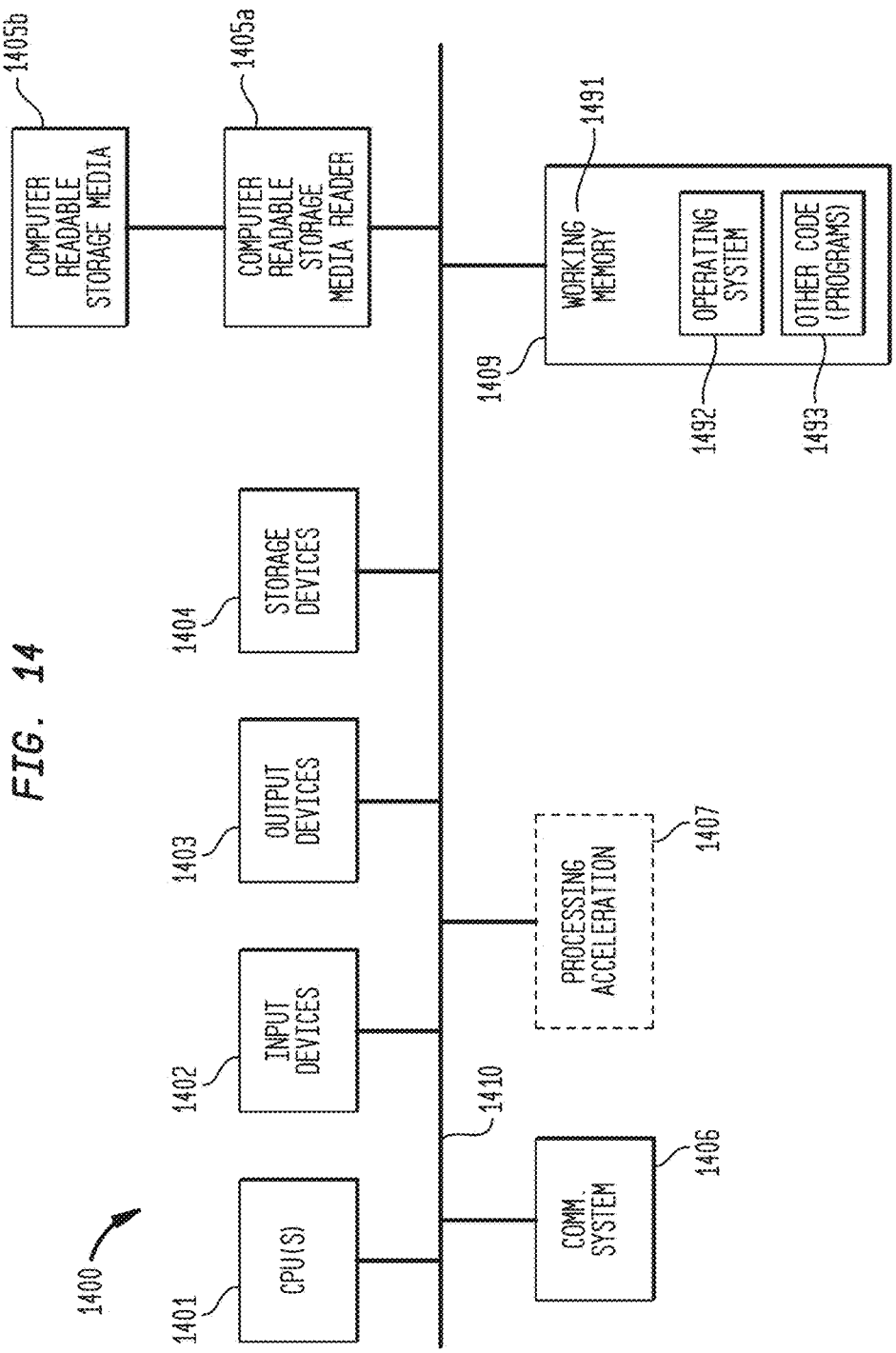
FIG. 14 shows one embodiment of a computing device.

The systems and methods described above can be implemented using an analyzer, or computing device, such as the computing device shown in FIG. 14. FIG. 14 broadly illustrates how individual system elements can be implemented. System 1400 is shown comprised of hardware elements that are electrically coupled via bus 1410, including a processor 1401, input device 1402, output device 1403, storage device 1404, computer-readable storage media reader 1405a, communications system 1406 processing acceleration (e.g., DSP or special-purpose processors) 1407 and memory 1409. Computer-readable storage media reader 1405a is further coupled to computer-readable storage media 1405b, the combination comprehensively representing remote, local, fixed and/or removable storage devices plus storage media, memory, etc. for temporarily and/or more permanently containing computer-readable information, which can include storage device 1404, memory 1409 and/or any other such accessible system 1400 resource. System 1400 also comprises software elements (shown as being currently located within working memory 1491) including an operating system 1492 and other code 1493, such as programs, applets, data and the like. As used herein, the term 'processor' includes any of one or more circuits, processors, controllers, filed-programmable gate arrays (FPGAs), microprocessors, application-specific integrated circuits (ASICs), other types of computational devices, or combinations thereof that are capable of performing functions ascribed to or associated with the processor.

System 1400 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 1400 component (e.g. within communications system 1406). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 1400 components will necessarily be required in all cases.

While various embodiments have been described as methods or apparatuses, it should be understood that embodiments can be implemented through code coupled with a computer, e.g., code resident on a computer or accessible by the computer. For example, software and databases could be utilized to implement many of the methods discussed above. Thus, in addition to embodiments accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments also be considered protected by this patent in their program code means as well. Furthermore, the embodiments may be embodied as code stored in a computer-readable memory of virtually any kind including, without limitation, RAM, ROM, magnetic media, optical media, or magneto-optical media. Even more generally, the embodiments could be implemented in software, or in hardware, or any combination thereof including, but not limited to, software running on a general purpose processor, microcode, PLAs, or ASICs.

It is also envisioned that embodiments could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

It is thought that the apparatuses and methods of embodiments described herein will be understood from this specification. While the above description is a complete description of specific embodiments, the above description should not be taken as limiting the scope of the patent as defined by the claims.

Other aspects, advantages, and modifications will be apparent to those of ordinary skill in the art to which the claims pertain. The elements and use of the above-described embodiments can be rearranged and combined in manners other than specifically described above, with any and all permutations within the scope of the disclosure.

Although the above description includes many specific examples, they should not be construed as limiting the scope of the invention, but rather as merely providing illustrations of some of the many possible embodiments of this method. The scope of the invention should be determined by the appended claims and their legal equivalents, and not by the examples given.

What is claimed is:

1. A system for acquiring microseismic data using sensor patches comprising:
   a microseismic event generator disposed in the subsurface of the earth along a first axis;
   a plurality of sensors capable of sensing microseismic data; a plurality of distinct patches of sensors disposed upon the surface, each distinct patch of sensors comprising multiple sensors, the patches of sensors being configured to sample data and noise and an analyzer having at least one processor, the analyzer being capable of recording and processing microseismic data from the plurality of sensors at a sampling interval of between 0.25 and 16 milliseconds to avoid aliasing over a predetermined time window in the range of one minute to several days.

2. The system of claim 1, wherein the microseismic event generator is the volume of the subsurface of the earth proximate a generally horizontal well bore.

3. The system of claim 1, wherein the sensors are geophones.

4. The system of claim 1, wherein the patches are disposed above the microseismic event generator in a configuration that allows accurate trilateration of microseismic event locations.

5. The system of claim 1, wherein the patches are disposed at a substantial horizontal distance from microseismic event generator to enhance depth resolution of the locations of the microseismic events.

6. The system of claim 1 wherein the dimensions of the patches are designed such that the noise is recorded with at least two regular samples per wavelength in the three dimensions of time, spatial x and spatial y, so that noise is adequately sampled rather than attenuated.

7. The system of claim 1, wherein a plurality of patches are positioned on the surface substantially symmetrically about the microseismic event generator.

8. The system of claim 1, wherein the patches are aligned substantially parallel to the microseismic event generator.

9. The system of claim 1, the sensors being autonomous geophones, disposed above the subsurface volume in order to capture about a full radiation pattern of large microseismic events.

10. The system of claim 1 wherein the sensors within a patch are disposed in one configuration selected from the group consisting of a rectangular grid, a curvilinear grid and a line segment.

11. The system of claim 1, wherein the analyzer is further structured and arranged to apply a plurality of directional filters, each filter corresponding to a patch and a location below the surface proximate the microseismic event generator, and then apply a source scanning algorithm to determine the locations of microseismic events below the surface of the earth.

12. A method for acquiring microseismic data using sensor patches comprising:
    deploying a plurality of sensors on or below the surface of the earth, the sensors being disposed in a plurality of distinct patches of sensors above a selected subsurface volume, each distinct patch of sensors comprising multiple sensors, the patches of sensors being configured to sample data and noise; and
    recording microseismic data from the plurality of distinct patches of sensors, at a sampling interval of between 0.25 and 16 milliseconds to avoid aliasing, over a predetermined time window in the range of one minute to several days.

13. The method of claim 12 wherein the sensors are geophones.

14. The method of claim 12 wherein at least three sensor patches are disposed on or below the surface of the earth in a configuration that allows trilateration of microseismic event locations to at least a predetermined degree of accuracy.

15. The method of claim 12, wherein the patches are disposed at a substantial horizontal distance from the selected subsurface volume to enhance depth resolution of the locations of the microseismic events.

16. The method of claim 12 wherein the dimensions of the patches of sensors are designed such that the noise is recorded with at least two regular samples per wavelength in the three dimensions of time, spatial x and spatial y, so that noise is adequately sampled rather than attenuated.

17. The method of claim 12 wherein a plurality of patches are positioned on the surface substantially symmetrically about a horizontal wellbore within the subsurface volume.

18. The method of claim 12, wherein the patches are aligned substantially parallel to a horizontal wellbore within the subsurface volume.

19. The method of claim 12 wherein the sensors are autonomous geophones, disposed above the subsurface volume in order to capture about a full radiation pattern of large microseismic events.

20. The method of claim 12 wherein the sensors within a patch are disposed in one configuration selected from the group consisting of a rectangular grid, a curvilinear grid and a line segment.

* * * * *